United States Patent
Decker et al.

(10) Patent No.: US 11,434,166 B2
(45) Date of Patent: *Sep. 6, 2022

(54) ARTICLES WITH A LOW-ELASTIC MODULUS LAYER AND RETAINED STRENGTH

(71) Applicant: CORNING INCORPORATED, Corning, NY (US)

(72) Inventors: Heather Bossard Decker, Arkport, NY (US); Shandon Dee Hart, Elmira, NY (US); Guangli Hu, Berkeley Heights, NJ (US); James Joseph Price, Corning, NY (US); Paul Arthur Sachenik, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,699

(22) Filed: Mar. 18, 2021

(65) Prior Publication Data

US 2021/0230055 A1    Jul. 29, 2021

Related U.S. Application Data

(60) Continuation of application No. 17/038,508, filed on Sep. 30, 2020, which is a division of application No.
(Continued)

(51) Int. Cl.
*C03C 17/34* (2006.01)
*C03C 17/36* (2006.01)
(Continued)

(52) U.S. Cl.
CPC .......... *C03C 17/34* (2013.01); *C03C 17/3417* (2013.01); *C03C 17/3435* (2013.01);
(Continued)

(58) Field of Classification Search
CPC . C03C 17/34; C03C 17/3417; C03C 17/3435; C03C 17/36; C03C 17/38;
(Continued)

(56) References Cited

U.S. PATENT DOCUMENTS 3,084,998 A   4/1963   Dess
4,168,113 A   9/1979   Chang et al.
(Continued)

FOREIGN PATENT DOCUMENTS

CN   201369036 Y   12/2009
CN   201465083 U   5/2010
(Continued)

OTHER PUBLICATIONS

European Patent Application No. 21163075.1, Extended European Search Report dated Jul. 22, 2021; 14 pages; European Patent Office.

(Continued)

*Primary Examiner* — Frank J Vineis
*Assistant Examiner* — Laura B Figg
(74) *Attorney, Agent, or Firm* — William Tucker

(57) ABSTRACT

One or more aspects of the disclosure pertain to an article including a film disposed on a glass substrate, which may be strengthened, where the interface between the film and the glass substrate is modified, such that the article has an improved average flexural strength, and the film retains key functional properties for its application. Some key functional properties of the film include optical, electrical and/or mechanical properties. The bridging of a crack from one of the film or the glass substrate into the other of the film or the glass substrate can be suppressed by inserting a nanoporous crack mitigating layer between the glass substrate and the film.

39 Claims, 12 Drawing Sheets

Related U.S. Application Data

14/053,093, filed on Oct. 14, 2013, now Pat. No. 10,829,409.

(60) Provisional application No. 61/820,395, filed on May 7, 2013, provisional application No. 61/712,908, filed on Oct. 12, 2012.

(51) Int. Cl.

| | | |
|---|---|---|
| C03C 21/00 | (2006.01) | |
| G06F 3/03 | (2006.01) | |
| C03C 17/42 | (2006.01) | |
| C03C 17/38 | (2006.01) | |

(52) U.S. Cl.
CPC ............ *C03C 17/36* (2013.01); *C03C 17/38* (2013.01); *C03C 17/42* (2013.01); *C03C 21/002* (2013.01); *G06F 3/03* (2013.01); *C03C 2217/425* (2013.01); *C03C 2217/948* (2013.01); *Y10T 428/2495* (2015.01); *Y10T 428/24851* (2015.01); *Y10T 428/24926* (2015.01); *Y10T 428/24975* (2015.01); *Y10T 428/24983* (2015.01); *Y10T 428/24996* (2015.04); *Y10T 428/24999* (2015.04)

(58) Field of Classification Search
CPC . C03C 17/42; C03C 21/002; C03C 2217/425; C03C 2217/948; G06F 3/03; Y10T 428/24851; Y10T 428/24926; Y10T 428/2495; Y10T 428/24975; Y10T 428/24983; Y10T 428/24996; Y10T 428/24999
See application file for complete search history.

(56) References Cited

U.S. PATENT DOCUMENTS

| | | |
|---|---|---|
| 4,526,818 A | 7/1985 | Hoshikawa et al. |
| 4,835,061 A | 5/1989 | Ohta et al. |
| 4,935,296 A | 6/1990 | Stevens |
| 4,995,684 A | 2/1991 | Tustison et al. |
| 5,190,824 A | 3/1993 | Itoh |
| 5,325,219 A | 6/1994 | Hanyu et al. |
| 6,091,131 A | 7/2000 | Cook et al. |
| 6,092,392 A | 7/2000 | Verlinden et al. |
| 6,187,248 B1 | 2/2001 | O'Neill et al. |
| 6,392,735 B1 | 5/2002 | Tani |
| 6,548,177 B2 | 4/2003 | Hieda et al. |
| 6,617,056 B1 | 9/2003 | Hara et al. |
| 6,707,610 B1 | 3/2004 | Woodard et al. |
| 6,815,070 B1 | 11/2004 | Buerkle et al. |
| 7,208,206 B2 | 4/2007 | Hieda et al. |
| 7,763,151 B2 | 7/2010 | Noguchi et al. |
| 8,081,169 B2 | 12/2011 | Lin et al. |
| 8,187,987 B2 | 5/2012 | Amin et al. |
| 8,713,792 B2 | 5/2014 | Sakai et al. |
| 2002/0055057 A1 | 5/2002 | Bekku et al. |
| 2003/0006704 A1 | 1/2003 | Morimoto et al. |
| 2003/0129379 A1 | 7/2003 | Yao et al. |
| 2003/0143401 A1 | 7/2003 | Hukari et al. |
| 2004/0115416 A1 | 6/2004 | Nonninger et al. |
| 2004/0180148 A1 | 9/2004 | Hieda et al. |
| 2004/0247949 A1 | 12/2004 | Akedo et al. |
| 2005/0236985 A1* | 10/2005 | Handa .................... B32B 17/10 313/511 |
| 2007/0190846 A1 | 8/2007 | Yamashita et al. |
| 2007/0273973 A1 | 11/2007 | Kursawe et al. |
| 2009/0142790 A1 | 6/2009 | Fang et al. |
| 2009/0159417 A1 | 6/2009 | Lin et al. |
| 2009/0220774 A1 | 9/2009 | Imai et al. |
| 2010/0047521 A1* | 2/2010 | Amin ...................... C03C 3/087 428/141 |
| 2011/0165393 A1 | 7/2011 | Bayne et al. |
| 2011/0212311 A1 | 9/2011 | Lemmer et al. |
| 2011/0216020 A1 | 9/2011 | Lee et al. |
| 2011/0236604 A1 | 9/2011 | Fujiwara et al. |
| 2011/0244225 A1 | 10/2011 | Hattori et al. |
| 2012/0196103 A1 | 8/2012 | Murashige et al. |
| 2012/0223912 A1 | 9/2012 | Kim |
| 2012/0327568 A1 | 12/2012 | Shedletsky et al. |
| 2013/0127202 A1 | 5/2013 | Hart |
| 2013/0169590 A1 | 7/2013 | Wickboldt et al. |
| 2013/0170224 A1 | 7/2013 | Huang et al. |
| 2014/0106146 A1 | 4/2014 | Decker et al. |
| 2014/0147654 A1* | 5/2014 | Walther .............. C23C 18/1245 428/312.6 |
| 2014/0261677 A1 | 9/2014 | Sakamoto et al. |

FOREIGN PATENT DOCUMENTS

| | | | |
|---|---|---|---|
| CN | 101997087 A | 3/2011 | |
| DE | 102011076754 A1 * | 12/2012 | ............ C23C 28/04 |
| EP | 2273476 A1 | 1/2011 | |
| EP | 2492250 A1 | 8/2012 | |
| JP | 2001-266759 A | 9/2001 | |
| JP | 2002-023649 A | 1/2002 | |
| JP | 2003-100212 A | 4/2003 | |
| JP | 2004-002111 A | 1/2004 | |
| JP | 2004-058376 A | 2/2004 | |
| JP | 2004-182491 A | 7/2004 | |
| JP | 2004-184672 A | 7/2004 | |
| JP | 2004-271935 A | 9/2004 | |
| JP | 2005-173462 A | 6/2005 | |
| JP | 2006-500624 A | 1/2006 | |
| JP | 2007-108592 A | 4/2007 | |
| JP | 2009-110026 A | 5/2009 | |
| JP | 2010-077021 A | 4/2010 | |
| JP | 4646294 B2 | 3/2011 | |
| JP | 2011-088789 A | 5/2011 | |
| JP | 2012-031018 A | 2/2012 | |
| JP | 2013-104959 A | 5/2013 | |
| KR | 10-2004-0017552 A | 2/2004 | |
| KR | 10-2010-0125435 A | 11/2010 | |
| KR | 10-2012-0073286 A | 7/2012 | |
| KR | 10-2013-0081567 A | 7/2013 | |
| TW | 201130648 A | 9/2011 | |
| WO | 2009/133625 A1 | 11/2009 | |
| WO | 2010/074748 A1 | 7/2010 | |
| WO | 2013/084900 A1 | 6/2013 | |

OTHER PUBLICATIONS

"Standard Test Method for Total Mass Loss and Collected Volatile Condensable Materials from Outgassing in a Vacuum Environment," ASTM International. Designation: E595-07.

Chakravarthy et al., "Thin Film and Substrate Cracking Under the Influence of Externally Applied Loads," Engineering Fracture Mechanics 72 (2005) p. 1286.

Cotterell et al.; "Buckling and Cracking of Thin Films on Compliant Substrates Under Compression"; International Journal of Fracture, 2000. 104(2): p. 169-179.

Dugnani et al. "flexrural strength by factography in modern brittle materials" J. Am. Ceram. Soc. 96 (12) 3908-3914 (2013).

English Translation of KR1020157012300 Notice of Allowance dated Oct. 31, 2018; 3 Pages; Korean Patent Office.

EP13783450.3 Examination Report dated Jan. 25, 2019, European Patent Office, 7 pgs.

European Patent Application No. 13783450.3 Office Action dated May 20, 2020; 4 Pages; European Patent Office.

European Patent Application No. 13783450.3; Examination Report dated Oct. 11, 2019; European Patent Office; 4 pgs.

Giannelis, Emmanuel. "Polymer Layered Silicate Nanocomposites." Adv. Mater. 1996, 8, No. 1, pp. 29-35.

He et al.; "Crack Deflection at an Interface Between Dissimilar Elastic Materials"; International Journal of Solids and Structures, 1989. 25(9): p. 1053-1067.

(56) References Cited

OTHER PUBLICATIONS

He, M.-Y. and J.W. Hutchinson, Kinking of a Crack Out of an Interface. Journal of Applied Mechanics, 1989. 56(2): p. 270-278.
Jannotti et al. "Ball impact response of unstrengthened and chemically strengthened glass bars" J. Am. Ceram. Soc. 1-9 (2013).
Jiao et al.; "Alignment Layer Effects on Thin Liquid Crystal Cells," Appl. Phys. Lett. 92, 061102, 2008.
JP2015536984 Office Action dated Aug. 8, 2017, Japan Patent Office.
Li et al; "Preparation and Properties of a High Temperature, Flexible and Colorless ITO Coated Polyimide Substrate", European Polymer Journal, 43, p. 3368, 2007.
Lim et al; "Flexible Organic Electroluminescent Devices Based on Fluorine-Containing Colorless Polyimide Substrates", Advanced Materials, 14, 18, p. 1275, 2002.
MEMSnet "Material Niobium Oxide Nb2O5), film" accessed Mar. 2016.
Myeon-Cheon Choi, Youngkyoo Kim, Chang-Sik Ha. "Polymers for flexible displays: From material selection to device applications." Progress in Polymer Science. vol. 33, Issue 6, Jun. 2008, pp. 581-630.
Patent Cooperation Treaty International Notification of Transmittal of the International Search Report and The Written Opinion of the International Searching Authority, international application No. PCT/US2013/064840; dated Jan. 31, 2014, 12 pages.
Quan et al. "Restraint of stress in fabricating the large areas of crack free porous silica films in the presence of composite polydimethylsiloxane", Journal of Sol-gel Science and Technology.
Rimsza et al. "Structural and MEchanical Properties of Nanoporous Silica" Published in Journal of the American Ceramic Society, published Nov. 2013.
Shyang-ho Chi, Yen-Ling Chung. "Cracking in coating-substrate composites with multi-layered and FGM coatings." Engineering Fracture Mechanics 70 (2003) 1227-1243.
TW102137010 Search Report dated Dec. 6, 2016, Taiwan Patent Office.
Zeng et al., "Investigation of Mechanical Properties of Transparent Conducting Oxide Thin Films". Thin Solid Films, 2003. 443(1-2): p. 60-65.).

* cited by examiner

ARTICLES WITH A LOW-ELASTIC MODULUS LAYER AND RETAINED STRENGTH

CLAIM OF PRIORITY

This application is a continuation application that claims the benefit of priority under 35 U.S.C. § 120 of U.S. patent application Ser. No. 17/038,508, filed Sep. 30, 2020, which is a divisional application that claims the benefit of priority under 35 U.S.C. § 121 of U.S. patent application Ser. No. 14/053,093, filed Oct. 14, 2013, now U.S. Pat. No. 10,829,409, which claims the benefit of priority under 35 U.S.C. § 119 of U.S. Provisional Application No. 61/712,908, filed on Oct. 12, 2012, and the benefit of priority under 35 U.S.C. § 119 of U.S. Provisional Application No. 61/820,395, filed on May 7, 2013, the entire contents of each of these documents are hereby incorporated herein by reference for all purposes.

BACKGROUND

This disclosure relates to articles including a glass substrate that has a film disposed on its surface, and a modified interface between the film and the glass substrate such that the glass substrate substantially retains its average flexural strength, and the film retains key properties for its application.

Articles including a glass substrate, which may be strengthened or strong as described herein, have found wide usage recently as a protective cover glass for displays, especially in touch-screen applications, and there is a potential for its use in many other applications, such as automotive or architectural windows and glass for photovoltaic systems. In many of these applications it can be advantageous to apply a film to the glass substrates. Exemplary films include indium-tin-oxide ("ITO") or other transparent conductive oxides (e.g., aluminum and gallium doped zinc oxides and fluorine doped tin oxide), hard films of various kinds (e.g., diamond-like carbon, $Al_2O_3$, AlN, $AlO_xN_y$, $Si_3N_4$, $SiO_xN_y$, $SiAl_xO_yN_z$, TiN, TiC), IR or UV reflecting layers, conducting or semiconducting layers, electronics layers, thin-film-transistor layers, or anti-reflection ("AR") films (e.g., $SiO_2$, $Nb_2O_5$ and $TiO_2$ layered structures). In many instances these films must necessarily be hard and/or have a high elastic modulus, or otherwise their other functional properties (e.g., mechanical, durability, electrical conductivity, optical properties) will be degraded. In most cases these films are thin films, that is, they generally have a thickness in the range of 0.005 μm to 10 μm (e.g., 5 nm to 10,000 nm).

When a film is applied to a surface of a glass substrate, which may be strengthened or characterized as strong, the average flexural strength of the glass substrate may be reduced, for example, when evaluated using ball-drop or ring-on-ring strength testing. This behavior has been measured to be independent of temperature effects (i.e., the behavior is not caused by significant or measurable relaxation of surface compressive stress in the strengthened glass substrate due to any heating). The reduction in average flexural strength is also apparently independent of any glass surface damage or corrosion from processing, and is apparently an inherent mechanical attribute of the article, even when thin films having a thickness in the range from about 5 nm to about 10 μm are utilized in the article. Without being bound by theory, this reduction in average flexural strength is believed to be associated with a low strain-to-failure of such films relative to the high strain-to-failure of strengthened or strong glass substrates, together with crack bridging between such a film and the glass substrate and, in some cases, an increase in the stress intensity factor at crack tips associated with high elastic modulus of the film and/or increased crack length of cracks that are bridging between the film and the glass substrate. In view of this new understanding, there is a need to prevent films from reducing the average flexural strength of glass substrates.

SUMMARY

One or more aspects of this disclosure pertains to an article including a glass substrate, a crack mitigating layer disposed on the glass substrate and a film disposed on the crack mitigating layer. In one or more embodiments, the crack mitigating layer is disposed on a first major surface of the glass substrate, forming a first interface, and the film is disposed on the crack mitigating layer, forming a second substrate. In one or more embodiments, a crack originating in the film requires a greater load to bridge across the second interface than the load required to bridge across the first interface. In other embodiments, the stress intensity factor (K) of a crack originating in the film is reduced as the crack bridges into one or more of the crack mitigating layer and the glass substrate. In some examples, the stress intensity factor is reduced by at least about 10%. In one or more embodiments, the crack mitigating layer causes the difference in load requirement and/or the change in the stress intensity factor. In other embodiments, the crack mitigating layer increases the load required for the crack to bridge from the film into the glass substrate by at least about 10%.

The crack mitigating layer may cause a crack, which originates in either the film or the glass substrate and enters into the crack mitigating layer, to remain within the crack mitigating layer. In one or more embodiments, the crack mitigating layer effectively confines a crack originating in one of the film and glass substrates from propagating into the other of such film and glass substrate. In one option, the crack mitigating layer causes the crack to propagate within the crack mitigating layer in a direction substantially parallel to the first interface and/or second interface. In one or more alternative embodiments, the crack mitigating layer causes the crack to propagate substantially along either the first interface or the second interface.

In other embodiments, the film has an elastic modulus that is greater than the elastic modulus of the crack mitigating layer. The elastic modulus of the crack mitigating layer may be about 50 GPa or less, in the range from about 1 GPa to about 50 GPa or in the range from about 5 GPa to about 40 GPa. The crack mitigating layer of some embodiments may include a porous material or a nanoporous material. The crack mitigating layer may include a porosity in the range from about 10% by volume to about 50% by volume. In some embodiments, the crack mitigating layer has an average pore size of less than about 50 nm. The porous or nanoporous material may include an inorganic material such as, for example, SiO, $SiO_x$, $SiO_2$, $Al_2O_3$, AlN, $AlO_xN_y$, $Si_3N_4$, $SiO_xN_y$, $SiAl_xO_yN_z$, $TiO_2$, $Nb_2O_5$, $Ta_2O_5$, $ZrO_2$, $GeO_2$, $SiC_xN_y$, $SiC_xO_yN_z$, SiC, Si, Ge, indium-tin-oxide, tin oxide, fluorinated tin oxide, aluminum zinc oxide, and/or zinc oxide. In other embodiments, the crack mitigating layer, which may be porous or non-porous, may include a polymeric material selected from one or more of polyimide, fluorinated polyimide, polyetherimide, or polyethersulfone. In one or more specific embodiments, the crack mitigating layer includes nanoporous vapor-deposited inorganic SiO, SiO$_x$, or SiO$_2$ having an elastic modulus in a range from about 5 GPa to about 40 GPa.

The crack mitigating layer may optionally exhibit an optical transmission haze of less than about 10%. In some embodiments, the crack mitigating layer may have a refractive index in a range from about 1.3 to about 1.7. The crack mitigating layer of some embodiments may exhibit a fracture toughness of about 1 MPa·m$^{1/2}$ or less.

The film of one or more embodiments includes one or more functional properties, such as optical properties, electrical properties and mechanical properties. The functional property or properties of the film are substantially retained after combination with the crack mitigating layer. In one variant, the film can include transparent conductive oxide layers, IR reflecting layers, UV reflecting layers, conducting layers, semiconducting layers, electronics layers, thin film transistor layers, EMI shielding layers, anti-reflection layers, anti-glare layers, dirt-resistant layers, self-cleaning layers, scratch-resistant layers, barrier layers, passivation layers, hermetic layers, diffusion-blocking layers, fingerprint-resistant layers and combinations thereof. The film may include $Al_2O_3$, AlN, $AlO_xN_y$, $Si_3N_4$, $SiO_xN_y$, $SiAl_xO_yN_z$, $TiO_2$, $Nb_2O_5$, $Ta_2O_5$, $ZrO_2$, $SiC_xN_y$, $SiC_xO_yN_z$, SiC, indium-tin-oxide, tin oxide, fluorinated tin oxide, aluminum zinc oxide, and/or zinc oxide.

The film may be formed from a single layer or a plurality of layers. The thickness of the film may be determined in relation to the thickness of the crack mitigating layer. In some embodiments, the thickness of the crack mitigating layer may be less than or equal to about 3 times the thickness of the film. In other embodiments, the thicknesses of the film and the crack mitigating layer may each be about 5 micrometers or less.

In one or more embodiments, the glass substrate includes opposing major surfaces and exhibits an average strain-to-failure that is greater than the average strain-to-failure of the film. For example, the glass substrate may exhibit an average strain-to-failure that is greater than about 0.5%. The glass substrate may be chemically strengthened and may exhibit a compressive stress greater than about 500 MPa and a compressive stress depth-of-layer greater than about 15 μm.

In one or more embodiments, the article exhibits an average flexural strength that is substantially greater than the average flexural strength exhibited by articles that include the glass substrate and the film but no crack mitigating layer.

A second aspect of this disclosure pertains to a method of forming an article. In one or more embodiments, the method includes a glass substrate, disposing a porous crack mitigating layer on the glass substrate, disposing a film having one or more functional properties on the crack mitigating layer, and controlling the porosity or the elastic modulus of the crack mitigating layer. In one or more embodiments, the method may include controlling the porosity or the elastic modulus of the crack mitigating layer to maintain the average flexural strength of the glass substrate and/or the functional properties of the film. The method includes forming the crack mitigating layer via vacuum deposition. The method of one or more embodiments may include strengthening the glass substrate.

DETAILED DESCRIPTION

Figure 1:
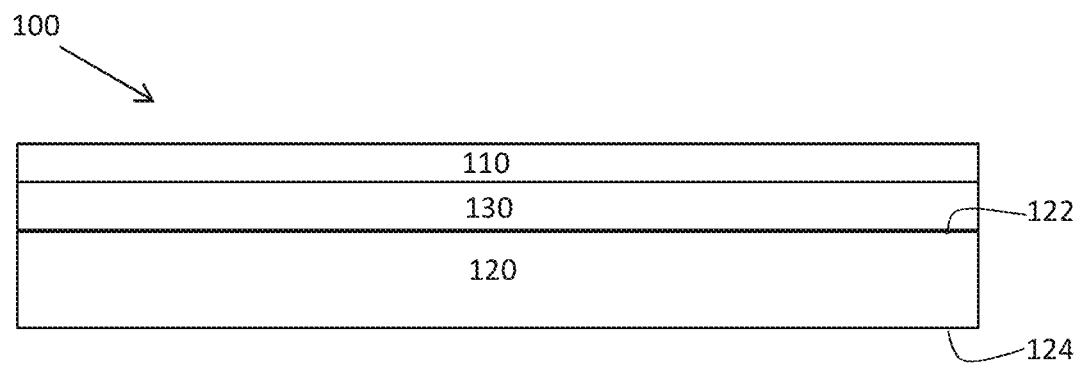
FIG. 1 is an illustration of an article comprising a glass substrate, a film and a crack mitigating layer, according to one or more embodiments.

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the disclosure. In addition, like or identical reference numerals may be used to identify common or similar elements.

Referring to FIG. 1, aspects of this disclosure include an article 100 including a film 110 and a glass substrate 120 wherein the interfacial properties between the film 110 and the glass substrate 120 are modified such that the article substantially retains its average flexural strength, and the film retains key functional properties for its application. In one or more embodiments, the article exhibits functional properties that are also retained after such modification. Functional properties of the film and/or article may include optical properties, electrical properties and/or mechanical properties, such as hardness, elastic modulus, strain-to-failure, abrasion resistance, mechanical durability, coefficient of friction, electrical conductivity, electrical resistivity, electron mobility, electron or hole carrier doping, optical refractive index, density, opacity, transparency, reflectivity, absorptivity, transmissivity and the like.

In one or more embodiment, the modification to the film-glass substrate interface includes preventing one or more cracks from bridging from one of the film 110 or the glass substrate 120 into the other of the film 110 or the glass substrate 120, while preserving other functional properties of the film 110 and/or the article. In one or more specific embodiments, as illustrated in FIG. 1, the modification of the interfacial properties includes disposing a crack mitigating layer 130 between the glass substrate 120 and the film 110.

The term "film", as applied to the film 110 and/or other films incorporated into the article 100, includes one or more layers that are formed by any known method in the art, including discrete deposition or continuous deposition processes. Such layers may be in direct contact with one another. The layers may be formed from the same material or more than one different material. In one or more alternative embodiments, such layers may have intervening layers of different materials disposed therebetween. In one or more embodiments a film may include one or more contiguous and uninterrupted layers and/or one or more discontinuous and interrupted layers (i.e., a layer having different materials formed adjacent to one another).

As used herein, the term "dispose" includes coating, depositing and/or forming a material onto a surface using any known method in the art. The disposed material may constitute a layer or film as defined herein. The phrase "disposed on" includes the instance of forming a material onto a surface such that the material is in direct contact with the surface and also includes the instance where the material is formed on a surface, where one or more intervening material(s) is between the disposed material and the surface. The intervening material(s) may constitute a layer or film, as defined herein.

As used herein, the term "average flexural strength" is intended to refer to the flexural strength of a glass-containing material (e.g., an article and/or a glass substrate), as tested through methods such as ring-on-ring, ball-on-ring, or ball drop testing. The term "average" when used in connection with average flexural strength or any other property is based on the mathematical average of measurements of such property on at least 5 samples, at least 10 samples or at least 15 samples or at least 20 samples. Average flexural strength may refer to the scale parameter of two parameter Weibull statistics of failure load under ring-on-ring or ball-on-ring testing. This scale parameter is also called the Weibull characteristic strength, at which a material's failure probability is 63.2%. More broadly, average flexural strength may also be defined by other tests such as a ball drop test, where the glass surface flexural strength is characterized by a ball drop height that can be tolerated without failure. Glass surface strength may also be tested in a device configuration, where an appliance or device containing the glass-containing material (e.g., an article and/or a glass substrate) article is dropped in different orientations that may create a surface flexural stress. Average flexural strength may in some cases also incorporate the strength as tested by other methods known in the art, such as 3-point bend or 4-point bend testing. In some cases, these test methods may be significantly influenced by the edge strength of the article.

In one or more embodiments, the crack mitigating layer 130 prevents or suppresses the bridging of one or more cracks originating in one of the film 110 or the glass substrate 120 into the other of the film 110 or the glass substrate 120. In one or more specific embodiments, the crack mitigating layer 130 prevents crack bridging from one of the film 110 or the glass substrate 120 into the other of the film 110 or the glass substrate 120 by causing an increase in the average strain-to-failure of the film 110. The crack mitigating layer 130 may increase the average strain-to-failure of the film 110 by reducing the stress that may be formed in the film 110 during formation or application on the glass substrate. In such embodiments, it is believed that the increase in the average strain-to-failure of the film 110 prevents cracks from bridging from one of the film 110 or the glass substrate 120 into the other of the film 110 or the glass substrate 120. In other embodiments, the crack mitigating layer 130 does not change the strain-to-failure of the film 110, that is, cracks still form in the film 110 under loading, but the bridging of these cracks between the glass substrate 120 and the film 110 is prevented or suppressed by the crack mitigating layer 130. In these embodiments, the crack mitigating layer 130 may prevent the cracks in the film 110 from bridging to the glass substrate 120 through crack tip blunting, crack arrest, crack deflection, delamination, or other related mechanisms, as will be further described below.

As used herein, the terms "bridge", or "bridging", refer to crack, flaw or defect formation and such crack, flaw or defect's growth in size and/or propagation from one material, layer or film into another material, layer or film. For example, bridging includes the instance where a crack that is present in the film 110 propagates into another material, layer or film (e.g., the glass substrate 120). The terms "bridge" or "bridging" also include the instance where a crack crosses an interface between different materials, different layers and/or different films. The materials, layers and/or films need not be in direct contact with one another for a crack to bridge between such materials, layers and/or films. For example, the crack may bridge from a first material into a second material, not in direct contact with the first material, by bridging through an intermediate material disposed between the first and second material. The same scenario may apply to layers and films and combinations of materials, layers and films. In the articles described herein, a crack may originate in one of the film 110 or the glass substrate 120 and bridge into the other of the film 110 or the glass substrate 120. As will be described herein, the crack mitigating layer 130 may prevent cracks from bridging between the film 110 and the glass substrate 120, regardless of where (i.e., the film 110 or the glass substrate 120) the crack originates.

The term "prevent", when associated with prevention of crack bridging, refers to preventing crack bridging at one or more selected load level(s) (or ranges of loads) or flexural state(s). This does not imply that crack bridging is prevented for all load levels or flexural states. Rather, this generally implies that crack bridging is prevented for a particular load, stress, or strain level or range that would ordinarily cause crack bridging without the presence of the crack mitigating layer.

In one or more embodiments, the crack mitigating layer 130 may not prevent crack bridging between the film 110 and the glass substrate 120, but rather the crack mitigating layer may suppress the growth of cracks that are bridging between the film 110 and the glass substrate 120, relative to an article without the crack mitigating layer. Accordingly, in one or more embodiments, there may be pre-existing cracks in one of the film 110 and/or the glass substrate 120 that bridge between the film 110 and glass substrate 120, or cracks may form during the application of load/stress, but the growth of these cracks is suppressed by the presence of the crack mitigating layer. As used herein, the term "suppress" when used in relation to crack growth includes delaying crack grown at lower loads until a higher load is applied to the article at which point the crack grows. The term "suppress" also includes reducing crack growth rate (or speed) at a given load or stress level applied to the article.

In other embodiments, the crack mitigating layer 130 may form a preferred path of crack propagation other than bridging between the film 110 and the glass substrate 120. In other words, the crack mitigating layer 130 may deflect a crack forming in one of the film 110 and the glass substrate 120 and propagating toward the other of the film 110 and the glass substrate 120 into the crack mitigating layer 130. In such embodiments, the crack may propagate through the crack mitigating layer 130 in a direction substantially parallel to the film-crack mitigating layer interface and/or the crack mitigating layer-glass substrate interface. In one or more embodiments, the article including the crack mitigating layer 130 may exhibit an improved average flexural strength over articles without the crack mitigating layer 130.

Figure 2:
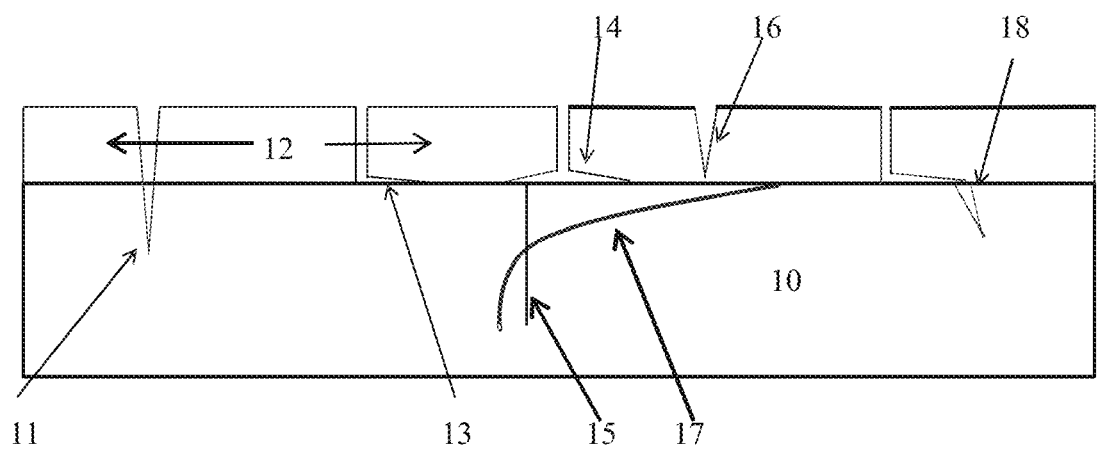
FIG. 2 is a schematic diagram of the development of a crack in a film and its possible bridging modes.

The following theoretical fracture mechanics analysis illustrates selected ways in which cracks may bridge within an article. FIG. 2 is a schematic illustrating the presence of a crack in a film disposed on a glass substrate and its possible bridging modes. The numbered elements in FIG. 2 are the glass substrate 10, the film 12 on top of a surface (unnumbered) of glass substrate 10, a two-sided deflection 14 into the interface between glass substrate 10 and film 12, an arrest 16 which is a crack that started to develop in film 12 but did not go completely through film 12, a "kinking" 18 which is a crack that developed in the surface of film 12, but when it reached the surface of the glass substrate 10 it did not penetrate into the glass substrate 12, instead it moved in a lateral direction as indicated in FIG. 2 and then penetrates the surface of the glass substrate 10 at another position, a penetration crack 11 that developed in the film 12 and penetrated into the glass substrate 10, a one-sided deflection 13, and a graph of tension vs. compression 17 in the glass substrate 10 compared to zero axis 15. Note that this schematic is not to scale and the glass substrate thickness typically extends further past the bottom of the figure (not shown). As illustrated, upon application of external loading (in such cases, tensile loading is the most detrimental situation), the flaws in the film can be preferentially activated to form cracks prior to the development of cracks in the residually compressed glass substrate. In the scenarios illustrated in FIG. 2, with continued increase of external loading, the cracks will bridge until they encounter the glass substrate. When the cracks reach the surface of substrate 10 the possible bridging modes of the crack, when it originates in the film are: (a) penetration into the glass substrate without changing its path as represented by numeral 11; (b) deflection into one side along the interface between the film and the glass substrate as indicated by numeral 13; (c) deflection into two sides along the interface as indicated by numeral 14, (d) first deflection along the interface and then kinking into the glass substrate as indicated by numeral 18, or (e) crack arrest as indicated by numeral 16 due to microscopic deformation mechanisms, for example, plasticity, nano-scale blunting, or nano-scale deflection at the crack tip. Cracks may originate in the film and may bridge into the glass substrate. The above described bridging modes are also applicable where cracks originate in the glass substrate and bridge into the film, for example where pre-existing cracks or flaws in the glass substrate may induce or nucleate cracks or flaws in the film, thus leading to crack growth or propagation from the glass substrate into the film, resulting in crack bridging.

Crack penetration into the glass substrate and/or film reduces the average flexural strength of the article and the glass substrate as compared to the average flexural strength of the glass substrate alone (i.e., without a film or a crack mitigating layer), while crack deflection, crack blunting or crack arrest (collectively referred to herein as crack mitigation) is preferable to help retain the average flexural strength of the article. Crack blunting and crack arrest can be distinguished from one another. Crack blunting may comprise an increasing crack tip radius, for example, through plastic deformation or yielding mechanisms. Crack arrest, on the other hand, could comprise a number of different mechanisms such as, for example, encountering a highly compressive stress at the crack tip, a reduction of the stress intensity factor at the crack tip resulting from the presence of a low-elastic modulus interlayer or a low-elastic modulus-to-high-elastic modulus interface transition; nano-scale crack deflection or crack tortuosity as in some polycrystalline or composite materials, strain hardening at the crack tip and the like.

Without being bound by theory, certain possible crack bridging paths can be analyzed in the context of linear elastic fracture mechanics. In the following paragraphs, one crack path is used as an example and the fracture mechanics concept is applied to the crack path to analyze the problem and illustrate the requirements of material parameters to help retain the average flexural strength performance of the article, for a particular range of materials properties.

Figure 3:
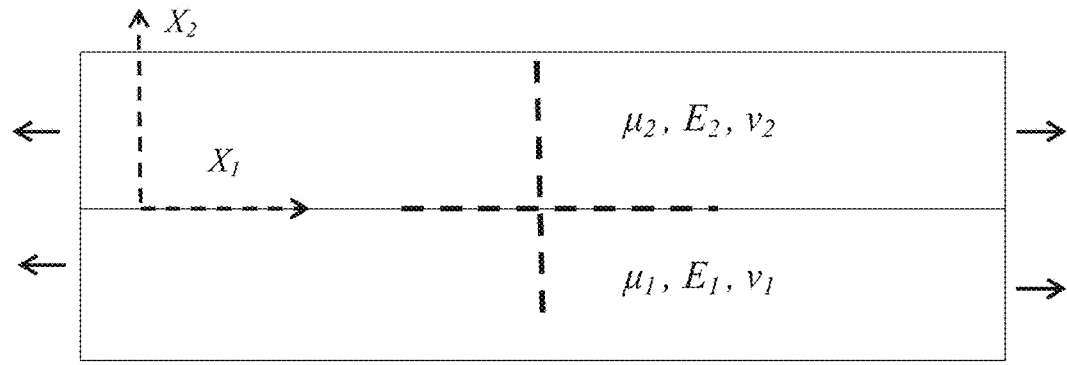
FIG. 3 is an illustration of the theoretical model for the presence of a crack in a film and its possible bridging as a function of elastic mismatch α.

FIG. 3 below shows the illustration of the theoretical model framework. This is a simplified schematic view of the interface region between the film 12 and glass substrate 10. The terms $\mu_1$, $E_1$, $v_1$, and $\mu_2$, $E_2$, $v_2$, are shear modulus, Young's modulus, Poisson's ratio of glass substrate and film materials, $\Gamma_c^{Glass}$ and $\Gamma_c^{IT}$ are critical energy release rate of glass substrate and the interface between substrate and film, respectively.

The common parameters to characterize the elastic mismatch between the film and the substrate are Dundurs' parameters $\alpha$ and $\beta$ [1], as defined below $$\alpha = \frac{\overline{E}_1 - \overline{E}_2}{\overline{E}_1 + \overline{E}_2} \qquad (1)$$

where $\overline{E}=E/(1-v^2)$ for plain strain and $$\beta = \frac{1}{2} \frac{\mu_1(1-2v_2) - \mu_2(1-2v_1)}{\mu_1(1-v_2) + \mu_2(1-v_1)} \qquad (2)$$

It is worth pointing out that critical energy release rate is closely related with the fracture toughness of the material through the relationship defined as $$\Gamma = \frac{1-v^2}{E} K_C^2 \qquad (3)$$

Under the assumption that there is a pre-existing flaw in the film, upon tensile loading the crack will extend vertically down as illustrated in FIG. 3. Right at the interface, the crack tends to deflect along the interface if $$\frac{G_d}{G_p} \geq \frac{\Gamma_c^{IT}}{\Gamma_c^{Glass}} \qquad (4)$$

and the crack will penetrate into the glass substrate if $$\frac{G_d}{G_p} \le \frac{\Gamma_c^{IT}}{\Gamma_c^{Glass}} \qquad (5)$$

where $G_d$ and $G_p$ and are energy release rates between deflected crack along the interface and the penetrated crack into the glass substrate [1]. On the left hand side of equations (4) and (5), the ratio $G_d/G_p$ is a strong function of elastic mismatch parameter α and weakly dependent on β; and on the right hand side, the toughness ratio $\Gamma_c^{IT}/\Gamma_c^{Glass}$ is a material parameter.

Figure 4:
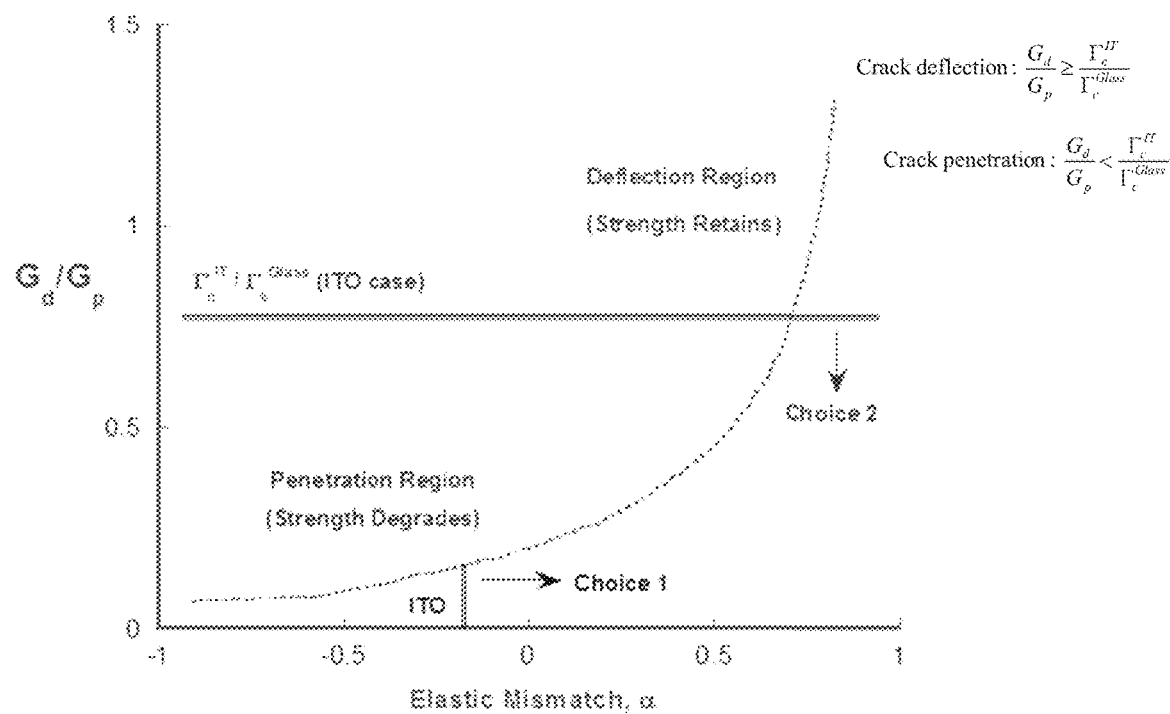
FIG. 4 is a diagram illustrating the energy release ratio $G_d/G_p$.

FIG. 4 graphically illustrates the trend of $G_d/G_p$ as a function of elastic mismatch α, reproduced from reference for doubly deflected cracks. (Ming-Yuan, H. and J. W. Hutchinson, *Crack deflection at an interface between dissimilar elastic materials.* International Journal of Solids and Structures, 1989. 25(9): p. 1053-1067).

It is evident that the ratio $G_d/G_p$ is strongly dependent on α. Negative α means the film is stiffer than the glass substrate and positive α means the film is softer than the glass substrate. The toughness ratio $\Gamma_c^{IT}/\Gamma_c^{Glass}$, which is independent of α is a horizontal line in FIG. 4. If criterion (4) is satisfied, in FIG. 4, at the region above the horizontal line, the crack tends to deflect along the interface and therefore is beneficial for the retention of a substrate's average flexural strength. On the other hand, if the criterion (5) is satisfied, in FIG. 4, at the region below the horizontal line, the crack tends to penetrate into glass substrate resulting in degradation of the average flexural strength.

With the above concept, in the following, an indium-tin-oxide (ITO) film is utilized as an illustrative example. For glass substrate, $E_1$=72 GPa, $v_1$=0.22, and $K_{Ic}$=0.7 MPa m$^{1/2}$; for ITO, $E_2$=99.8 GPa, $v_2$=0.25. (Zeng, K., et al., *Investigation of mechanical properties of transparent conducting oxide thin films.* Thin Solid Films, 2003. 443(1-2): p. 60-65). The interfacial toughness between the ITO film and glass substrate can be approximately $\Gamma_{in}$=5 J/m$^2$, depending on deposition conditions. (Cotterell, B. and Z. Chen, *Buckling and cracking of thin films on compliant substrates under compression.* International Journal of Fracture, 2000. 104 (2): p. 169-179). This will give the elastic mismatch α=−0.17 and $\Gamma_c^{IT}/\Gamma_c^{Glass}$=0.77. These values are plotted in FIG. 4. This fracture analysis predicts that the crack penetration into the glass substrate for the ITO film leading to degradation of the average flexural strength of the glass. This is believed to be one of the potential underlying mechanisms observed with various indium-tin-oxide or other transparent conductive oxide films that are disposed on glass substrates, including strengthened or strong glass substrates. As shown in FIG. 4, one way to mitigate the degradation of the average flexural strength can be to select appropriate materials to change the elastic mismatch α (choice 1) or to adjust the interfacial toughness (choice 2).

The theoretical analysis outlined above suggests that a crack mitigating layer 130 can be used to better retain the article strength. Specifically, the insertion of a crack mitigating layer between a glass substrate 120 and a film 110 makes crack mitigation, as defined herein, a more preferred path and thus the article is better able to retain its strength. In some embodiments, the stress intensity factor of a crack originating in the film may be modified to suppress or prevent the growth of the crack from the film into the glass substrate when there is a mitigating layer 130.

Glass Substrate

Referring to FIG. 1, the article 100 includes a glass substrate 120, which may be strengthened or strong, as described herein, having opposing major surfaces 122, 124, a film 110 disposed on a at least one opposing major surface (122 or 124) and a crack mitigating layer 130 disposed between the film 110 and the glass substrate 120. In one or more alternative embodiments, the crack mitigating layer 130 and the film 110 may be disposed on the minor surface (s) of the glass substrate in addition to or instead of being disposed on at least one major surface (122 or 124). As used herein, the glass substrate 120 may be substantially planar sheets, although other embodiments may utilize a curved or otherwise shaped or sculpted glass substrate. The glass substrate 120 may be substantially clear, transparent and free from light scattering. The glass substrate may have a refractive index in the range from about 1.45 to about 1.55. In one or more embodiments, the glass substrate 120 may be strengthened or characterized as strong, as will be described in greater detail herein. The glass substrate 120 may be relatively pristine and flaw-free (for example, having a low number of surface flaws or an average surface flaw size less than about 1 micron) before such strengthening. Where strengthened or strong glass substrates 120 are utilized, such substrates may be characterized as having a high average flexural strength (when compared to glass substrates that are not strengthened or strong) or high surface strain-to-failure (when compared to glass substrates that are not strengthened or strong) on one or more major opposing surfaces of such substrates.

Additionally or alternatively, the thickness of the glass substrate 120 may vary along one or more of its dimensions for aesthetic and/or functional reasons. For example, the edges of the glass substrate 120 may be thicker as compared to more central regions of the glass substrate 120. The length, width and thickness dimensions of the glass substrate 120 may also vary according to the article 100 application or use.

The glass substrate 120 according to one or more embodiments includes an average flexural strength that may be measured before and after the glass substrate 120 is combined with the film 110, crack mitigating layer 130 and/or other films or layers. In one or more embodiments described herein, the article 100 retains its average flexural strength after the combination of the glass substrate 120 with the film 110, crack mitigating layer 130 and/or other films, layers or materials, when compared to the average flexural strength of the glass substrate 120 before such combination. In other words, the average flexural strength of the article 100 is substantially the same before and after the film 110, crack mitigating layer 130 and/or other films or layers are disposed on the glass substrate 120. In one or more embodiments, the article 100 has an average flexural strength that is significantly greater than the average flexural strength of a similar article that does not include the crack mitigating layer 130 (e.g. higher strength than an article that comprises film 110 and glass substrate 120 in direct contact, without an intervening crack mitigating layer).

In accordance with one or more embodiments, the glass substrate 120 has an average strain-to-failure that may be measured before and after the glass substrate 120 is combined with the film 110, crack mitigating layer 130 and/or other films or layers. The term "average strain-to-failure" refers to the strain at which cracks propagate without application of additional load, typically leading to catastrophic failure in a given material, layer or film and, perhaps even bridge to another material, layer, or film, as defined herein. Average strain-to-failure may be measured using, for example, ball-on-ring testing. Without being bound by theory, the average strain-to-failure may be directly correlated to the average flexural strength using appropriate mathematical conversions. In specific embodiments, the glass substrate 120, which may be strengthened or strong as described herein, has an average strain-to-failure that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater. In specific embodiments, the glass substrate has an average strain-to-failure of 1.2%, 1.4%, 1.6%, 1.8%, 2.2%, 2.4%, 2.6%, 2.8% or 3% or greater. The average strain-to-failure of the film 110 may be less than the average strain-to-failure of the glass substrate 120 and/or the average strain-to-failure of the crack mitigating layer 130. Without being bound by theory, it is believed that the average strain-to-failure of a glass substrate or any other material is dependent on the surface quality of such material. With respect to glass substrates, the average strain-to-failure of a specific glass substrate is dependent on the conditions of ion exchange or strengthening process utilized in addition to or instead of the surface quality of the glass substrate.

In one or more embodiments, the glass substrate 120 retains its average strain-to-failure after combination with the film 110, crack mitigating layer 130 and/or other films or layers. In other words, the average strain-to-failure of the glass substrate 120 is substantially the same before and after the film 110, crack mitigating layer 130 and/or other films or layers are disposed on the glass substrate 120. In one or more embodiments, the article 100 has an average strain-to-failure that is significantly greater than the average strain-to-failure of a similar article that does not include the crack mitigating layer 130 (e.g. higher strain-to-failure than an article that comprises film 110 and glass substrate 120 in direct contact, without an intervening crack mitigating layer). For example, the article 100 may exhibit an average strain-to-failure that is at least 10% higher, 25% higher, 50% higher, 100% higher, 200% higher or 300% higher than the average strain-to-failure of a similar article that does not include the crack mitigating layer 130.

The glass substrate 120 may be provided using a variety of different processes. For instance, example glass substrate forming methods include float glass processes and down-draw processes such as fusion draw and slot draw.

In the float glass process, a glass substrate that may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrates having a uniform thickness that may possess relatively pristine surfaces. Because the average flexural strength of the glass substrate is controlled by the amount and size of surface flaws, a pristine surface that has had minimal contact has a higher initial strength. When this high strength glass substrate is then further strengthened (e.g., chemically), the resultant strength can be higher than that of a glass substrate with a surface that has been lapped and polished. Down-drawn glass substrates may be drawn to a thickness of less than about 2 mm. In addition, down drawn glass substrates may have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass substrate. The fusion draw method offers the advantage that, because the two glass films flowing over the channel fuse together, neither of the outside surfaces of the resulting glass substrate comes in contact with any part of the apparatus. Thus, the surface properties of the fusion drawn glass substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

Once formed, glass substrates may be strengthened to form strengthened glass substrates. As used herein, the term "strengthened glass substrate" may refer to a glass substrate that has been chemically strengthened, for example through ion-exchange of larger ions for smaller ions in the surface of the glass substrate. However, other strengthening methods known in the art, such as thermal tempering, may be utilized to form strengthened glass substrates. As will be described, strengthened glass substrates may include a glass substrate having a surface compressive stress in its surface that aids in the strength preservation of the glass substrate. Strong glass substrates are also within the scope of this disclosure and include glass substrates that may not have undergone a specific strengthening process, and may not have a surface compressive stress, but are nevertheless strong. Such strong glass substrates articles may be defined as glass sheet articles or glass substrates having an average strain-to-failure greater than about 0.5%, 0.7%, 1%, 1.5%, or even greater than 2%. Such strong glass substrates can be made, for example, by protecting the pristine glass surfaces after melting and forming the glass substrate. An example of such protection occurs in a fusion draw method, where the surfaces of the glass films do not come into contact with any part of the apparatus or other surface after forming. The glass substrates formed from a fusion draw method derive their strength from their pristine surface quality. A pristine surface quality can also be achieved through etching or polishing and subsequent protection of glass substrate surfaces, and other methods known in the art. In one or more embodiments, both strengthened glass substrates and the strong glass substrates may comprise glass sheet articles having an average strain-to-failure greater than about 0.5%, 0.7%, 1%, 1.5%, or even greater than 2%, for example when measured using ring-on-ring or ball-on-ring flexural testing.

As mentioned above, the glass substrates described herein may be chemically strengthened by an ion exchange process to provide a strengthened glass substrate 120. The glass substrate may also be strengthened by other methods known in the art, such as thermal tempering. In the ion-exchange process, typically by immersion of the glass substrate into a molten salt bath for a predetermined period of time, ions at or near the surface(s) of the glass substrate are exchanged for larger metal ions from the salt bath. In one embodiment, the temperature of the molten salt bath is about 350° C. to 450° C. and the predetermined time period is about two to about eight hours. The incorporation of the larger ions into the glass substrate strengthens the glass substrate by creating a compressive stress in a near surface region or in regions at and adjacent to the surface(s) of the glass substrate. A corresponding tensile stress is induced within a central region or regions at a distance from the surface(s) of the glass substrate to balance the compressive stress. Glass substrates utilizing this strengthening process may be described more specifically as chemically-strengthened glass substrates 120 or ion-exchanged glass substrates 120. Glass substrates that are not strengthened may be referred to herein as non-strengthened glass substrates.

In one example, sodium ions in a strengthened glass substrate 120 are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, phosphates, halides, and the like may be used in the ion exchange process.

The replacement of smaller ions by larger ions at a temperature below that at which the glass network can relax produces a distribution of ions across the surface(s) of the strengthened glass substrate 120 that results in a stress profile. The larger volume of the incoming ion produces a compressive stress (CS) on the surface and tension (central tension, or CT) in the center of the strengthened glass substrate 120. The compressive stress is related to the central tension by the following relationship:

$$CS = CT\left(\frac{t - 2DOL}{DOL}\right)$$

where t is the total thickness of the strengthened glass substrate 120 and compressive depth of layer (DOL) is the depth of exchange. Depth of exchange may be described as the depth within the strengthened glass substrate 120 (i.e., the distance from a surface of the glass substrate to a central region of the glass substrate), at which ion exchange facilitated by the ion exchange process takes place.

In one embodiment, a strengthened glass substrate 120 can have a surface compressive stress of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass substrate 120 may have a compressive depth of layer 15 µm or greater, 20 µm or greater (e.g., 25 µm, 30 µm, 35 µm, 40 µm, 45 µm, 50 µm or greater) and/or a central tension of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass substrate 120 has one or more of the following: a surface compressive stress greater than 500 MPa, a depth of compressive layer greater than 15 µm, and a central tension greater than 18 MPa.

Without being bound by theory, it is believed that strengthened glass substrates 120 with a surface compressive stress greater than 500 MPa and a compressive depth of layer greater than about 15 µm typically have greater strain-to-failure than non-strengthened glass substrates (or, in other words, glass substrates that have not been ion exchanged or otherwise strengthened). In some embodiments, the benefits of one or more embodiments described herein may not be as prominent with non-strengthened or weakly strengthened types of glass substrates that do not meet these levels of surface compressive stress or compressive depth of layer, because of the presence of handling or common glass surface damage events in many typical applications. However, as mentioned previously, in other specific applications where the glass substrate surfaces can be adequately protected from scratches or surface damage (for example by a protective coating or other layers), strong glass substrates with a relatively high strain-to-failure can also be created through forming and protection of a pristine glass surface quality, using methods such as the fusion forming method. In these alternate applications, the benefits of one or more embodiments described herein can be similarly realized.

Example ion-exchangeable glasses that may be used in the strengthened glass substrate 120 may include alkali aluminosilicate glass compositions or alkali aluminoborosilicate glass compositions, though other glass compositions are contemplated. As used herein, "ion exchangeable" means that a glass substrate is capable of exchanging cations located at or near the surface of the glass substrate with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass substrate 120 includes a glass composition with at least 6 wt. % aluminum oxide. In a further embodiment, a glass substrate 120 includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the glass substrate 120 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the glass substrate 120, which may optionally be strengthened or strong, comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq$ (MgO+CaO) $\leq 10$ mol. %.

A still further example glass composition suitable for the glass substrate 120, which may optionally be strengthened or strong, comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq$ (MgO+CaO) $\leq 7$ mol. %.

In a particular embodiment, an alkali aluminosilicate glass composition suitable for the glass substrate 120, which may optionally be strengthened or strong, comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In still another embodiment, the glass substrate, which may optionally be strengthened or strong, may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; ($Na_2O$+$B_2O_3$)—$Al_2O_3$≤2 mol. %; 2 mol. %≤$Na_2O$—$Al_2O_3$≤6 mol. %; and 4 mol. %≤($Na_2O$+$K_2O$)—$Al_2O_3$≤10 mol. %.

In some embodiments, the glass substrate 120, which may optionally be strengthened or strong, may comprise an alkali silicate glass composition comprising: 2 mol % or more of $Al_2O_3$ and/or $ZrO_2$, or 4 mol % or more of $Al_2O_3$ and/or $ZrO_2$.

In some embodiments, the glass substrate used in the glass substrate 120 may be batched with 0-2 mol. % of at least one fining agent selected from a group that includes $Na_2SO_4$, NaCl, NaF, NaBr, $K_2SO_4$, KCl, KF, KBr, and $SnO_2$.

The glass substrate 120 according to one or more embodiments can have a thickness ranging from about 50 µm to 5 mm. Example glass substrate 120 thicknesses range from 100 µm to 500 µm, e.g., 100, 200, 300, 400 or 500 µm. Further example glass substrate 120 thicknesses range from 500 µm to 1000 µm, e.g., 500, 600, 700, 800, 900 or 1000 µm. The glass substrate 120 may have a thickness greater than 1 mm, e.g., about 2, 3, 4, or 5 mm. In one or more specific embodiments, the glass substrate 120 may have a thickness of 2 mm or less or less than 1 mm. The glass substrate 120 may be acid polished or otherwise treated to remove or reduce the effect of surface flaws.

Film

The article 100 includes a film 110 disposed on a surface of the glass substrate 120. The film 110 may be disposed on one or both major surfaces 122, 124 of the glass substrate 120. In one or more embodiments, the film 110 may be disposed on one or more minor surfaces (not shown) of the glass substrate 120 in addition to or instead of being disposed on one or both major surfaces 122, 124. In one or more embodiments, the film 110 is free of macroscopic scratches or defects that are easily visible to the eye.

In one or more embodiments, the film may lower the average flexural strength of articles incorporating such films and glass substrate, through the mechanisms described herein In one or more embodiments, such mechanisms include instances in which the film may lower the average flexural strength of the article because crack(s) developing in such film bridge into the glass substrate. In other embodiments, the mechanisms include instances in which the film may lower the average flexural strength of the article because cracks developing in the glass substrates bridge into the film. The film of one or more embodiments may exhibit a strain-to-failure of 2% or less or a strain-to-failure that is less than the strain to failure of the glass substrates described herein. films including any of these attributes may be characterized as brittle.

In accordance with one or more embodiments, the film 110 may have a strain-to-failure (or crack onset strain level) that is lower than the strain-to-failure of the glass substrate 120. For example, the film 110 may have strain-to-failure of about 2% or less, about 1.8% or less, about 1.6% or less, about 1.5% or less, about 1.4% or less, about 1.2% or less, about 1% or less, about 0.8% or less, about 0.6% or less, about 0.5% or less, about 0.4% or less or about 0.2% or less. In some embodiments, the strain-to-failure of the film 110 may be lower than that the strain-to-failure of the strengthened glass substrates 120 that have a surface compressive stress greater than 500 MPa and a compressive depth of layer greater than about 15 µm. In one or more embodiments, the film 110 may have a strain-to-failure that is at least 0.1% lower or less, or in some cases, at least 0.5% lower or less than the strain-to-failure of the glass substrate 120. In one or more embodiments, the film 110 may have a strain-to-failure that is at least 0.15%, 0.2%, 0.25%, 0.3%, 0.35%, 0.4%, 0.45%, 0.55%, 0.6%, 0.65%, 0.7%, 0.75%, 0.8%, 0.85%, 0.9%, 0.95% or 1% lower or less than the strain-to-failure of the glass substrate 120.

Exemplary films 110 may have an elastic modulus of at least 25 GPa and/or a hardness of at least 1.75 GPa, although some combinations outside of this range are possible. In some embodiments the film 110 may have an elastic modulus 50 GPa or greater or even 70 GPa or greater. For example, the film elastic modulus may be 55 GPa, 60 GPa, 65 GPa, 75 GPa, 80 GPa, 85 GPa or more. In one or more embodiments, the film 110 may have a hardness greater than 3.0 GPa. For example, the film 110 may have a hardness of 5 GPa, 5.5 GPa, 6 GPa, 6.5 GPa, 7 GPa, 7.5 GPa, 8 GPa, 8.5 GPa, 9 GPa, 9.5 GPa, 10 GPa or greater. These elastic modulus and hardness values can be measured for such films 110 using known diamond nano-indentation methods that are commonly used for determining the elastic modulus and hardness of films. Exemplary diamond nano-indentation methods may utilize a Berkovich diamond indenter.

The films 110 described herein may also exhibit a fracture toughness less than about 10 MPa·m$^{1/2}$, or in some cases less than 5 MPa·m$^{1/2}$, or in some cases less than 1 MPa·m$^{1/2}$. For example, the film may have a fracture toughness of 4.5 MPa·m$^{1/2}$, 4 MPa·m$^{1/2}$, 3.5 MPa·m$^{1/2}$, 3 MPa·m$^{1/2}$, 2.5 MPa·m$^{1/2}$, 2 MPa·m$^{1/2}$, 1.5 MPa·m$^{1/2}$, 1.4 MPa·m$^{1/2}$, 1.3 MPa·m$^{1/2}$, 1.2 MPa·m$^{1/2}$, 1.1 MPa·m$^{1/2}$, 0.9 MPa·m$^{1/2}$, 0.8 MPa·m$^{1/2}$, 0.7 MPa·m$^{1/2}$, 0.6 MPa·m$^{1/2}$, 0.5 MPa·m$^{1/2}$, 0.4 MPa·m$^{1/2}$, 0.3 MPa·m$^{1/2}$, 0.2 MPa·m$^{1/2}$, 0.1 MPa·m$^{1/2}$ or less.

The films 110 described herein may also have a critical strain energy release rate ($G_{IC}=K_{IC}^2/E$) that is less than about 0.1 kJ/m$^2$, or in some cases less than 0.01 kJ/m$^2$. In one or more embodiments, the film 110 may have a critical strain energy release rate of 0.09 kJ/m$^2$, 0.08 kJ/m$^2$, 0.07 kJ/m$^2$, 0.06 kJ/m$^2$, 0.05 kJ/m$^2$, 0.04 kJ/m$^2$, 0.03 kJ/m$^2$, 0.02 kJ/m$^2$, 0.0075 kJ/m$^2$, 0.005 kJ/m$^2$, 0.0025 kJ/m$^2$ or less.

In one or more embodiments, the film 110 may include a plurality of layers. In one or more embodiments, each of the layers of the film may be characterized as brittle based on one or more of the layer's impact on the average flexural strength of the article and/or the layer's strain-to-failure, fracture toughness, or critical strain energy release rate values, as otherwise described herein. In one variant, the layers of the film 110 need not have identical properties such as elastic modulus and/or fracture toughness. In another variant, the layers of the film 110 may include different materials from one another.

In one or more embodiments, the film 110 may have a tensile stress that was built in the film or introduced into the film during deposition or formation. In some cases, the tensile stress into the film 110 may be difficult to avoid while retaining the other desired properties. This tensile stress can cause a film 110 to crack or fail more readily, for example, in some cases this tensile stress may lower the strain-to-failure (crack onset strain) of the film 110. Moreover, cracks originating in the film 110 can bridge more readily from the film 110 into the glass substrate 120 under the right conditions, due in part to the tensile stress. Additionally or alternatively, the tensile stress in the film 110 may cause the a film 110 to crack or fail more readily because cracks originating in the glass substrate 120 can bridge more readily from the glass substrate 120 into the film 110 under the right conditions. As will be described in greater detail below, the crack mitigating layer 130 may allow the film 110 to relax during deposition or formation, where the film is disposed on the glass substrate 120 after the crack mitigating layer 130 is disposed on the glass substrate 120. Additionally or alternatively, the crack mitigating layer 130 may reduce the amount of stress that is created locally in the film 110 during loading (i.e., during the application of an external force on the film, such as the flexure experienced by the film during ring-on-ring testing), or during flexure of the article 100.

The compositions or material(s) of the film 110 are not particularly limited. Some non-limiting examples of film 110 materials include oxides such as $SiO_2$, $Al_2O_3$, $TiO_2$, $Nb_2O_5$, $Ta_2O_5$; oxynitrides such as $SiO_xN_y$, $SiAl_xO_yN_z$, and $AlO_xN_y$; nitrides such as $SiN_x$, $AlN_x$, cubic boron nitride, and $TiN_x$; carbides such as SiC, TiC, and WC; combinations of the above such as oxycarbides and oxy-carbo-nitrides (for example, $SiC_xO_y$ and $SiC_xO_yN_z$); semiconductor materials such as Si and Ge; transparent conductors such as indium-tin-oxide, tin oxide, fluorinated tin oxide, aluminum zinc oxide, or zinc oxide; carbon nanotube or graphene-doped oxides; silver or other metal-doped oxides, highly siliceous polymers such as highly cured siloxanes and silsesquioxanes; diamond or diamond-like-carbon materials; or selected metal films which can exhibit a fracture behavior.

The film 110 can be disposed on the glass substrate 120 by vacuum deposition techniques, for example, chemical vapor deposition (e.g., plasma enhanced chemical vapor deposition or atmospheric pressure chemical vapor deposition), physical vapor deposition (e.g., reactive or nonreactive sputtering or laser ablation), thermal, resistive, or e-beam evaporation, or atomic layer deposition. The film 110 may also be disposed on one or more surfaces 122, 124 of the glass substrate 120 using liquid-based techniques, for example sol-gel coating or polymer coating methods, for example spin, spray, slot draw, slide, wire-wound rod, blade/knife, air knife, curtain, gravure, and roller coating among others. In some embodiments it may be desirable to use adhesion promoters, such as silane-based materials, between the film 110 and the glass substrate 120, between the glass substrate 120 and crack mitigating layer 130, between the layers (if any) of the crack mitigating layer 130, between the layers (if any) of the film 110 and/or between the film 110 and the crack mitigating layer 130. In one or more alternative embodiments, the film 110 may be disposed on the glass substrate 120 as a transfer layer.

The film 110 thickness can vary depending on the intended use of the article 100. In one embodiment the film 110 thickness may be in the ranges from about 0.01 µm to about 0.5 µm or from about 0.01 µm to about 20 µm. In another embodiment, the film 110 may have a thickness in the range from about 0.05 µm to about 10 µm, from about 0.05 µm to about 0.5 µm, from about 0.01 µm to about 0.15 µm or from about 0.015 µm to about 0.2 µm.

In some embodiments it may be advantageous to include a material in the film 110 that has either:

(1) a refractive index that is similar to the refractive index of either the glass substrate 120, the crack mitigating layer 130 and/or other films or layers in order to minimize optical interference effects;

(2) a refractive index (real and/or imaginary components) that is tuned to achieve anti-reflective interference effects; and/or (3) a refractive index (real and/or imaginary components) that is tuned to achieve wavelength-selective reflective or wavelength-selective absorptive effects, such as to achieve UV or IR blocking or reflection, or to achieve coloring/tinting effects.

In one or more embodiments, the film 110 may have a refractive index that is greater than the refractive index of the glass substrate 120 and/or greater than the refractive index of the crack mitigating layer 130. In one or more embodiments, the film may have a refractive index in the range from about 1.7 to about 2.2, or in the range from about 1.4 to about 1.6, or in the range from about 1.6 to about 1.9.

The film 110 may also serve multiple functions, or be integrated with films or layers that serve other functions than the film 110 or even the same function(s) as the film 110. The film 110 may include UV or IR light reflecting or absorbing layers, anti-reflection layers, anti-glare layers, dirt-resistant layers, self-cleaning layers, scratch-resistant layers, barrier layers, passivation layers, hermetic layers, diffusion-blocking layers, fingerprint-resistant layers, and the like. Further, the film 110 may include conducting or semi-conducting layers, thin film transistor layers, EMI shielding layers, breakage sensors, alarm sensors, electrochromic materials, photochromic materials, touch sensing layers, or information display layers. The film 110 and/or any of the foregoing layers may include colorants or tint. When information display layers are integrated into the article 100, the article 100 may form part of a touch-sensitive display, a transparent display, or a heads-up display. It may be desirable that the film 110 performs an interference function, which selectively transmits, reflects, or absorbs different wavelengths or colors of light. For example, the films 110 may selectively reflect a targeted wavelength in a heads-up display application.

Functional properties of the film 110 may include optical properties, electrical properties and/or mechanical properties, such as hardness, elastic modulus, strain-to-failure, abrasion resistance, mechanical durability, coefficient of friction, electrical conductivity, electrical resistivity, electron mobility, electron or hole carrier doping, optical refractive index, density, opacity, transparency, reflectivity, absorptivity, transmissivity and the like. These functional properties are substantially maintained or even improved after the film 110 is combined with the glass substrate 120, crack mitigating layer 130 and/or other films included in the article 100.

Crack Mitigating Layer

The crack mitigating layer 130 according to one or more embodiments may have a critical strain energy release rate ($G_{IC}=K_{IC}^2/E$) that is greater than the critical strain energy release rate of the film 110. In one or more embodiments, the film 110 may have a critical strain energy release rate of about 0.1 kJ/m² or less and the crack mitigating layer 130 may have a critical strain energy release rate of greater than about 0.1 kJ/m². The crack mitigating layer 130 may have a critical strain energy release rate of about 1.0 kJ/m² or greater. In specific embodiments, the crack mitigating layer 130 may have a critical strain energy release rate in a range of about 0.05 kJ/m² to about 100 kJ/m², while the film 110 may have a critical strain energy release rate less than about 0.05 kJ/m². The crack mitigating layer 130 may have a critical strain energy release rate in the range from about 0.05 kJ/m² to about 90 kJ/m², from about 0.5 kJ/m² to about 80 kJ/m², from about 0.5 kJ/m² to about 70 kJ/m², from about 0.5 kJ/m² to about 60 kJ/m², from about 0.5 kJ/m² to about 50 kJ/m², from about 0.5 kJ/m² to about 40 kJ/m², from about 0.5 kJ/m² to about 30 kJ/m², from about 0.5 kJ/m² to about 20 kJ/m², from about 0.5 kJ/m² to about 10 kJ/m², from about 0.5 kJ/m² to about 5 kJ/m², from about 1 kJ/m² to about 100 kJ/m², from about 5 kJ/m² to about 100 kJ/m², from about 10 kJ/m² to about 100 kJ/m², from about 20 kJ/m² to about 100 kJ/m², from about 30 kJ/m² to about 100 kJ/m², from about 40 kJ/m² to about 100 kJ/m², from about 50 kJ/m² to about 100 kJ/m², from about 60 kJ/m² to about 100 kJ/m², from about 70 kJ/m² to about 100 kJ/m², from about 80 kJ/m² to about 100 kJ/m², from about 90 kJ/m² to about 100 kJ/m², from about 0.05 kJ/m² to about 1 kJ/m², from about 1 kJ/m² to about 5 kJ/m², from about 5 kJ/m² to about 10 kJ/m², from about 10 kJ/m² to about 20 kJ/m², from about 20 kJ/m² to about 30 kJ/m², from about 30 kJ/m² to about 40 kJ/m², from about 40 kJ/m² to about 50 kJ/m², from about 50 kJ/m² to about 60 kJ/m², from about 60 kJ/m² to about 70 kJ/m², from about 70 kJ/m² to about 80 kJ/m² and from about 80 kJ/m² to about 90 kJ/m².

In such embodiments, the crack mitigating layer 130 has a greater critical strain energy release rate than the film 110 and, therefore, can release strain energy from a crack bridging from one of the film 110 and the glass substrate 120 into the other of the film 110 and the glass substrate 120. Such strain energy release stops the crack from bridging across the interface between the film 110 and the glass substrate 120, or alternately may suppress the growth of cracks that are already bridging across the interface between the film 110 and the glass substrate 120, which may also be bridging through the crack mitigating layer 130. This suppression of crack growth may, for example, lead to a higher required stress, strain, or load level in order to induce significant crack growth, relative to a similar article without the crack mitigating layer. In some embodiments, this suppression of crack growth may originate from a lowered stress-intensity-factor at the tips of bridging cracks, which may be induced by a relatively low elastic modulus or low yield stress or significant plastic deformation of the crack mitigating layer. In one or more embodiments, one or more of these crack mitigation mechanisms occurs regardless of where the crack originates (i.e., the film 110 or the glass substrate 120).

In accordance with one or more embodiments, the crack mitigating layer 130 may have an average strain-to-failure that is greater than the average strain-to-failure of the film 110. In one or more embodiments, the crack mitigating layer 130 may have an average strain-to-failure that is equal to or greater than about 0.5%, 0.7%, 1%, 1.5%, 2%, or even 4%. The crack mitigating layer 130 may have an average strain-to-failure of 0.6%, 0.8%, 0.9%, 1.1%, 1.2%, 1.3%, 1.4%, 1.6%, 1.7%, 1.8%, 1.9%, 2.2%, 2.4%, 2.6%, 2.8%, 3%, 3.2%, 3.4%, 3.6%, 3.8%, 5% or 6% or greater. In one or more embodiments, the film 110 may have an average strain-to-failure (crack onset strain) that is 1.5%, 1.0%, 0.7%, 0.5%, or even 0.4% or less. The film 110 may have an average strain-to-failure of 1.4%, 1.3%, 1.2%, 1.1%, 0.9%, 0.8%, 0.6%, 0.3%, 0.2%, 0.1% or less. The average strain-to-failure of the glass substrate 120 may be greater than the average strain-to-failure of the film 110, and in some instances, may be greater than the average strain-to-failure of the crack mitigating layer 130. In some specific embodiments, the crack mitigating layer 130 may have a higher average strain-to-failure than the glass substrate, to minimize any negative mechanical effect of the crack mitigating layer on the glass substrate.

In one or more embodiments, the crack mitigating layer 130 may have a fracture toughness of 1 MPa·m$^{1/2}$ or greater, for example 2 MPa·m$^{1/2}$ or greater, or 5 MPa·m$^{1/2}$ or greater. The crack mitigating layer 130 may also have a fracture toughness in the range from about 1 MPa·m$^{1/2}$ to about 5 MPa·m$^{1/2}$, or from about 2 MPa·m$^{1/2}$ to about 4 MPa·m$^{1/2}$. In one or more specific embodiments, the crack mitigating layer 130 may have a fracture toughness of 6 MPa·m$^{1/2}$, 7 MPa·m$^{1/2}$, 8 MPa·m$^{1/2}$, 9 MPa·m$^{1/2}$, 10 MPa·m$^{1/2}$ or greater. In such embodiments, the crack mitigating layer 130 average strain-to-failure and/or fracture toughness properties prevents the crack from bridging across the interface between the film 110 and the glass substrate 120. In one or more embodiments, this crack mitigation mechanism occurs regardless of where the crack originates (i.e., the film 110 or the glass substrate 120). The fracture toughness of the crack mitigating layer 130 may alternatively be low to provide a low toughness crack mitigating layer, as will be described in greater detail below. In such embodiments, the crack mitigating layer 130 may exhibit a fracture toughness that is about 50% or less than 50% of the fracture toughness of either the glass substrate 120 or the film. In more specific embodiments, the fracture toughness of the crack mitigating layer 130 may be about 25% or less than 25% of the fracture toughness of either the glass substrate 120 or the film. For example, the crack mitigating layer 130 may exhibit a fracture toughness of about 1 MPa·m$^{1/2}$ or less, 0.75 MPa·m$^{1/2}$ or less, 0.5 MPa·m$^{1/2}$ or less, 0.4 MPa·m$^{1/2}$ or less, 0.3 MPa·m$^{1/2}$ or less, 0.25 MPa·m$^{1/2}$ or less, 0.2 MPa·m$^{1/2}$ or less, and all ranges and sub-ranges there between.

The crack mitigating layer 130 may have a refractive index that is greater than the refractive index of the glass substrate 120. In one or more embodiments, the refractive index of the crack mitigating layer 130 may be less than the refractive index of the film 110. In a more specific embodiment, the refractive index of the crack mitigating layer 130 may be between the refractive index of the glass substrate 120 and the film 110. For example, the refractive index of the crack mitigating layer 130 may be in the range from about 1.45 to about 1.95, from about 1.5 to about 1.8, or from about 1.6 to about 1.75. Alternatively, the crack mitigating layer may have a refractive index that is substantially the same as the glass substrate, or a refractive index that is not more than 0.05 index units greater than or less than the glass substrate over a substantial portion of the visible wavelength range (e.g. from 450 to 650 nm).

In one or more embodiments, the crack mitigating layer 130 is able to withstand high temperature processes. Such processes can include vacuum deposition processes such as chemical vapor deposition (e.g., plasma enhanced chemical vapor deposition), physical vapor deposition (e.g., reactive or nonreactive sputtering or laser ablation), thermal or e-beam evaporation and/or atomic layer deposition. In one or more specific embodiments, the crack mitigating layer is able to withstand a vacuum deposition process in which the film 110 and/or other films disposed on the glass substrate 120 are deposited on the crack mitigating layer 130 via vacuum deposition. As used herein, the term "withstand" includes the resistance of the crack mitigating layer 130 to temperatures exceeding 100° C., 200° C., 300° C., 400° C. and potentially even greater temperatures. In some embodiments, the crack mitigating layer 130 may be considered to withstand the vacuum deposition or temperature treatment process if the crack mitigating layer 130 experiences a weight loss of 10% or less, 8% or less, 6% or less, 4% or less, 2% or less or 1% or less, after deposition of the film 110 and/or other films on the glass substrate (and on the crack mitigating layer 130). The deposition process (or testing after the deposition process) under which the crack mitigating layer experiences weight loss can include temperatures of about 100° C. or greater, 200° C. or greater, 300° C. or greater, 400° C. or greater; environments that are rich in a specific gas (e.g., oxygen, nitrogen, argon etc.); and/or environments in which deposition may be performed under high vacuum (e.g. $10^{-6}$ Torr), under atmospheric conditions and/or at pressures therebetween (e.g., 10 mTorr). As will be discussed herein, the material utilized to form the crack mitigating layer 130 may be specifically selected for its high temperature tolerances (i.e., the ability to withstand high temperature processes such as vacuum deposition processes) and/or its environmental tolerances (i.e., the ability to withstand environments rich in a specific gas or at a specific pressure). These tolerances may include high temperature tolerance, high vacuum tolerance, low vacuum outgassing, a high tolerance to plasma or ionized gases, a high tolerance to ozone, a high tolerance to UV, a high tolerance to solvents, or a high tolerance to acids or bases. In some instances, the crack mitigating layer 130 may be selected to pass an outgassing test according to ASTM E595.

In one or more embodiments, the crack mitigating layer 130 prevents degradation of the average flexural strength of the glass substrate 120. In another embodiment, the crack mitigating layer 130 prevents the film 110 from degrading the average flexural strength of the glass substrate 120. The crack mitigating layer 130 may prevent cracks from bridging between the film 110 and the glass substrate 120. The crack mitigating layer 130 of one or more embodiments may increase the average strain-to-failure of the film 110 and thus, prevents degradation of the average flexural strength of the glass substrate 120. In one or more alternative embodiments, the crack mitigating layer 130 increases the average flexural strength of the article 100, when compared to articles that do not include such a crack mitigating layer but include a glass substrate and a film, as described herein.

The crack mitigating layer 130 may prevent degradation of the average strain-to-failure of the glass substrate 120 in some instances, while in other instances, the crack mitigating layer 130 may prevent the film 110 from degrading the average strain-to-failure of the glass substrate 120. In another embodiment, the crack mitigating layer 130 prevents cracks from bridging between the film 110 and the glass substrate 120, thus preventing the film 110 from degrading the average strain-to-failure of the glass substrate 120. In one or more alternative embodiments, the crack mitigating layer 130 increases the average strain-to-failure of the article 100, when this average strain-to-failure is compared to the average strain-to-failure of articles that do not include a crack mitigating layer but include a glass substrate and a film, as described herein.

In one or more embodiments, the crack mitigating layer 130 may have a low-elastic modulus and/or low-hardness. Low-elastic modulus materials and low hardness materials substantially overlap as many low-elastic modulus materials are also low hardness materials. However, these two properties (i.e., low-elastic modulus and low hardness) are distinguished herein because they highlight two different mechanisms or methods by which a crack can be mitigated (i.e., deflected, arrested or blunted) before bridging between the film 110 and the glass substrate 120. In one or more embodiments, low-elastic modulus crack mitigating layers may suppress the growth of cracks that are already bridging across the interface between the film 110 and the glass substrate 120, which may also be bridging through the crack mitigating layer 130. This suppression of crack growth may, for example, lead to a higher required stress, strain, or load level in order to induce significant crack growth, relative to a similar article without the crack mitigating layer. The crack mitigating layer 130 may have an elastic modulus so low that the crack mitigating layer 130 is unable to drive or propagate a crack from one of the film 110 and glass substrate 120 to the other of the film 110 and glass substrate 120. In some embodiments, this suppression of crack growth may originate from a lowered stress intensity factor at the tips of bridging cracks, which may be induced by a relatively low-elastic modulus of the crack mitigating layer. Such crack mitigating layers may have an elastic modulus that is less than the glass substrate, less than about 50 GPa, less than about 30 GPa, less than about 15 GPa or even less than about 5 GPa. The stress intensity factor is accepted as indicating the driving force for crack growth. A reduction in the stress intensity factor is believed to delay or suppress crack growth from the film into the glass substrate (meaning higher load levels are required for crack growth within the glass substrate than would be needed without the low-elastic modulus layer).

The crack mitigating layer 130 may have a hardness that is less than about 3.0 GPa, less than 2.0 GPa or even less than 1.0 GPa. These elastic modulus and hardness values can be measured using known diamond nano-indentation methods that are commonly used for determining the elastic modulus and hardness of films. Exemplary diamond nano-indentation methods utilize a Berkovich diamond indenter.

In one or more embodiments, the crack mitigating layer 130 may also exhibit a low yield stress, a low shear modulus, plastic or ductile deformation, or other known properties for strain energy release without fracture. In embodiments where the crack mitigating layer exhibits a low yield stress, the yield stress may be less than 500 MPa, less than 100 MPa, or even less than 10 MPa.

In embodiments in which the crack mitigating layer 130 exhibits a low-elastic modulus, low yield stress, or plastic and/or ductile deformation behavior, the crack mitigating layer 130 can deform to release strain energy and prevent crack bridging or propagation between the film 110 and glass substrate 120. These ductile crack mitigating layers may also comprise the high strain-to-failure values listed above for the crack mitigating layer.

An exemplary crack mitigating layer 130 may be a polymeric film. Such films may have a low-elastic modulus or a low Tg that cannot support high values of stress within the deposited film 110, thus allowing the film 110 to partially relax and lower the tensile stress within, while minimizing the transmission of stress into the glass substrate 120. This reduces the stress intensity factor of the flaws on the glass substrate as compared to a scenario without polymeric film.

In one or more embodiments, the crack mitigating layer 130 physically prevents alignment of cracks originating in the film 110 and the glass substrate 120. In other words, a crack present in the film 110 cannot align with a crack present in the glass substrate 120 because the crack mitigating layer 130 physically prevents such alignment. Alternately or additionally, the crack mitigating layer 130 may have an engineered microstructure that provides a tortuous path for crack propagation, providing an alternative path for strain energy release and minimizing or preventing crack bridging between the glass substrate 120 and film 110.

In one or more embodiments, the crack mitigating layer 130 may include: porous oxides, such as $SiO_2$, SiO, $SiO_x$, $Al_2O_3$; $TiO_2$, $ZrO_2$, $Nb_2O_5$, $Ta_2O_5$, $GeO_2$ and similar material(s) known in the art; porous versions of the films mentioned elsewhere herein, for example porous indium-tin-oxide, porous aluminum-zinc-oxide, or porous fluorinated-tin-oxide; porous nitrides or carbides, for example $Si_3N_4$, AlN, TiN, TiC; porous oxycarbides and oxy-carbo-nitrides, for example, $SiC_xO_y$ and $SiC_xO_yN_z$; porous semiconductors such as Si or Ge; porous oxynitrides such as $SiO_xN_y$, $AlO_xN_y$, or $SiAl_xO_yN_z$; porous metals such as Al, Cu, Ti, Fe, Ag, Au, and others metals; tough or nanostructured inorganics (which may be porous or non-porous), for example, zinc oxide, certain Al alloys, Cu alloys, steels, or stabilized tetragonal zirconia; (including transformation toughened, partially stabilized, yttria stabilized, ceria stabilized, calcia stabilized, and magnesia stabilized zirconia); zirconia-toughened ceramics (including zirconia toughened alumina); ceramic-ceramic composites; carbon-ceramic composites; fiber- or whisker-reinforced ceramics or glass-ceramics (for example, SiC or $Si_3N_4$ fiber- or whisker-reinforced ceramics); metal-ceramic composites; porous or non-porous hybrid organic-inorganic materials, for example, nanocomposites, polymer-ceramic composites, polymer-glass composites, fiber-reinforced polymers, carbon-nanotube- or graphene-ceramic composites, silsesquioxanes, polysilsesquioxanes, or "ORMOSILs" (organically modified silica or silicate), and/or a variety of porous or non-porous polymeric materials, for example siloxanes, polysiloxanes, polyacrylates, polyacrylics, PI (polyimides), fluorinated polyimide, polyamides, PAI (polyamideimides), polycarbonates, polysulfones, PSU or PPSU (polyarylsulfones), fluoropolymers, fluoroelastomers, lactams, polycylic olefins, and similar materials, including, but not limited to PDMS (polydimethylsiloxane), PMMA (poly(methyl methacrylate)), BCB (benzocyclobutene), PEI (polyetherimide), poly(arylene ethers) such as PEEK (polyether-ether-ketone), PES (polyethersulfone) and PAR (polyarylate), PET (polyethylene terephthalate), PEN (polyethylene napthalate=poly(ethylene-2,6-napthalene dicarboxylate), FEP (fluorinated ethylene propylene), PTFE (polytetrafluoroethylene), PFA (perfluroalkoxy polymer, e.g., trade names Teflon®, Neoflon®) and similar materials. Other suitable materials include modified polycarbonates, some versions of epoxies, cyanate esters, PPS (polyphenylsulfides), polyphenylenes, polypyrrolones, polyquinoxalines, and bismaleimides. In some embodiments, suitable polyacrylates can include poly(butyl acrylate). In some cases it will be desirable to choose the high-temperature polymeric materials such as siloxanes, silsesquioxanes, polyimides, BCB, fluoropolymers, and others listed herein or known in the art because these materials will tolerate a wider range of temperatures for deposition and/or curing of the film 110. Examples of BCB polymers include the Cyclotene™ resins from Dow Chemical. Examples of polyimides and polyimide precursors include Pyralin™ resins from HD Microsystems or electronics grade polyamic acid solution from Sigma Aldrich (cat. no. 431206). The polyimides may include fluorinated or non-fluorinated polyimides such as those disclosed in U.S. Pat. No. 5,325,219 and related references, or other work known in the art such as "Preparation and Properties of a High Temperature, Flexible and Colorless ITO Coated Polyimide Substrate", European Polymer Journal, 43, p. 3368, 2007; "Flexible Organic Electroluminescent Devices Based on Fluorine-Containing Colorless Polyimide Substrates", Advanced Materials, 14, 18, p. 1275, 2002; and "Alignment layer effects on thin liquid crystal cells," Appl. Phys. Lett. 92, 061102, 2008. Examples of silsesquioxanes include Accuglass® Spin-on-Glasses from Honeywell or FOx® Flowable Oxides from Dow Corning.

The crack mitigating layer 130 may be disposed between the film 110 and the glass substrate 120 by a variety of methods. The crack mitigating layer 130 can be disposed using vacuum deposition techniques, for example, chemical vapor deposition (e.g., plasma enhanced chemical vapor deposition), physical vapor deposition (e.g., reactive or nonreactive sputtering or laser ablation), thermal, resistive, or e-beam evaporation and/or atomic layer deposition. The crack mitigating layer 130 may also be disposed using liquid-based deposition techniques, for example sol-gel coating or polymer coating methods, for example spin, spray, slot draw, slide, wire-wound rod, blade/knife, air knife, curtain, roller, gravure coating among others and other methods known in the art.

In one or more embodiments, the crack mitigating layer 130 may include a porous layer, or more specifically, a nanoporous layer. As used herein, the term "nanoporous" includes materials with traditionally-defined "pores" (e.g., openings or voids) and also includes materials that are characterized by a lower density or a lower elastic modulus than is expected for fully dense materials having the same or similar chemical composition. Thus, the "pores" in the nanoporous layer may take the form of columnar voids, atomic vacancies, spherical pores, interstices between grains or particles, regions of low or varying density, or any other geometry that leads to a macroscopic decrease in density or elastic modulus for the nanoporous layer. The volume fraction of porosity can be estimated from refractive index measurements using known methods, for materials with nanoscale pores and no light scattering or very low light scattering. In one or more embodiments, the volume fraction of porosity may be greater than about 5%, greater than about 10%, or greater than about 20%. In some embodiments the volume fraction of porosity may be less than about 90%, or less than about 60%, to preserve mechanical durability of the nanoporous layers during handling and end use.

The nanoporous layer may be substantially optically transparent and free of light scattering, for example having an optical transmission haze of 10% of less, 9% or less, 8% or less, 7% or less, 6% or less, 5% or less, 4% or less, 3% or less, 2% or less, 1% or less and all ranges and sub-ranges therebetween. The transmission haze of the nanoporous layer may be controlled by controlling the average sizes of pores, as defined herein. Exemplary average pore sizes in the nanoporous layer may include 200 nm or less, 100 nm or less, 90 nm or less, 80 nm or less, 70 nm or less, 60 nm or less, 50 nm or less, 40 nm or less, 30 nm or less, 20 nm or less, 10 nm or less, 5 nm or less and all ranges and sub-ranges therebetween. These pore sizes can be estimated from light scattering measurements, or directly analyzed using transmission electron microscopy (TEM) and other known methods. The nanoporous layer of some embodiments may have a low-elastic modulus, and may serve to strengthen the article by preventing crack bridging, or suppressing crack growth as described elsewhere herein.

In other cases, the nanoporous layer may reduce the stress intensity factor ($K_{1C}$) at the tip(s) of one or more cracks originating in one of the film and the glass substrate and propagating toward the other of the film and the glass substrate. Without a low-elastic modulus crack mitigating layer, the stress intensity factor at the crack tips will increase significantly as the size of a crack in the film approaches the thickness of the film, (e.g. as a crack from the film approaches the interface with the glass substrate). This condition where the stress intensity factor at the crack tips increases favors penetration of a crack from the film into the glass substrate. Conversely, in some cases where a crack may be growing or propagating through a film and a low-elastic modulus crack mitigating layer, as the crack approaches the interface between the low-elastic modulus crack mitigating layer and the glass substrate, the stress intensity factor at the crack tip decreases substantially. The decrease in the stress intensity factor at the crack tip is especially prominent where the crack mitigating layer has an elastic modulus that is lower than the elastic modulus of the glass substrate. This decrease in the stress intensity factor due to the presence of the low-elastic modulus crack mitigating layer suppresses the tendency for crack growth into the glass substrate, and thus increases the overall average flexural strength of the article relative to a similar article without the low-elastic modulus crack mitigating layer.

In one or more embodiments where the crack mitigating layer includes a nanoporous layer, the crack mitigating layer may at least partially delaminate during the loading process that causes crack growth or crack formation in the film and/or the crack mitigating layer. This delamination occurs at the interface between crack mitigating layer and the glass substrate. In other embodiments, at the interface between the crack mitigating layer and the film, the film may at least partially delaminate during a loading process that causes crack growth or formation in the film. Without being bound by theory, delamination or partial delamination of the crack mitigating layer and/or film reduces the stress concentrations in the glass substrate. Accordingly, it is believed that a reduction in stress concentrations in the glass substrate causes an increase in the load or strain level that is required for the glass substrate (and ultimately the article) to fail. In this manner, a crack mitigating layer that includes a nanoporous layer prevents a decrease or increases the average flexural strength of the article, as compared to articles without the crack mitigating layer.

In one or more embodiments, the crack mitigating layer may cause a crack originating in the film or the glass substrate and entering into the crack mitigating layer to remain in the crack mitigating layer. Alternatively or additionally, the crack mitigating layer effectively confines a crack originating in one of the film and glass substrates from propagating into the other of such film and glass substrate. These behaviors may be characterized individually or collectively as crack deflection. The crack mitigating layer may cause cracks originating in the film or the glass substrate and entering the crack mitigating layer to remain in the crack mitigating layer by creating favorable conditions in which the crack deflects into and stays within the crack mitigating layer, instead of propagating into the glass substrate or the film. In one or more embodiments, the crack mitigating layer may cause cracks originating in the film or the glass substrate and entering the crack mitigating layer to remain in the crack mitigating layer by creating a less tortuous path for crack propagation into and/or through the crack mitigating layer, instead of into the glass substrate or the film. In one or more embodiments, the crack mitigating layer, which can include a nanoporous layer, may provide a low toughness layer that exhibits a low fracture toughness and/or a low critical strain energy release rate. One or more of these attributes (i.e., low fracture toughness and low critical strain energy release rate) may cause this crack deflection into the crack mitigating layer instead of through the crack mitigating layer into the film and/or glass substrate. For example, the crack mitigating layer 130 may exhibit a fracture toughness of about 1 MPa·m$^{1/2}$ or less, 0.75 MPa·m$^{1/2}$ or less, 0.5 MPa·m$^{1/2}$ or less, 0.4 MPa·m$^{1/2}$ or less, 0.3 MPa·m$^{1/2}$ or less, 0.25 MPa·m$^{1/2}$ or less, 0.2 MPa·m$^{1/2}$ or less, and all ranges and sub-ranges there between. In other examples, the crack mitigating layer may exhibit a critical strain energy release rate that is less than 0.25 times or less than 0.5 times the critical strain energy release rate of the glass substrate. In specific embodiments, the critical strain energy release rate of the crack mitigating layer can be less than about 0.05 kJ/m$^2$, less than about 0.005 kJ/m$^2$, less than about 0.003 kJ/m$^2$, less than about 0.002 kJ/m$^2$, less than about 0.001 kJ/m$^2$, but in some embodiments, greater than about 0.0001 kJ/m$^2$ (i.e. greater than about 0.1 J/m$^2$). In embodiments in which the crack mitigating layer includes a nanoporous layer, a crack originating in one of the film and the glass substrate may be deflected by the crack mitigating layer and may propagate through the crack mitigating layer, in a direction that is substantially parallel to the interface formed by the crack mitigating layer 130 and glass substrate 120 and the interface formed by the film 110 and the crack mitigating layer 130. In such embodiments, the crack mitigating layer 130 provides a preferred path for crack propagation. In this way, the crack is deflected from bridging between the film and the glass substrate.

In one or more embodiments, the nanoporous layer may include an inorganic material. In one or more specific embodiments, the crack mitigating layer only includes a nanoporous layer and is nanoporous throughout. The nanoporous layer may include inorganic materials and may, alternatively, exclude organic materials. The nanoporous layer of one or more embodiments may exhibit higher temperature tolerance, robustness to UV ozone or plasma treatments, UV transparency, robustness to environmental aging, low outgassing in vacuum, and the like. Such nanoporous layers may be characterized as vacuum-deposited nanoporous layers. In addition, the use of an inorganic material provides flexibility in formation techniques. For example, such inorganic nanoporous layers may be formed by vacuum deposition (e.g. thermal evaporation, e-beam evaporation, RF sputtering, DC sputtering, chemical vapor deposition, plasma-enhanced chemical vapor deposition, atmospheric pressure chemical vapor deposition, and the like). In instances where the film is also formed by vacuum deposition, both the crack mitigating layer and the film can be formed in the same or similar vacuum deposition chamber or using the same or similar coating equipment.

In one or more embodiments, the crack mitigating layer may include an inorganic nanoporous layer that exhibits low intrinsic film stresses. In specific embodiments, such crack mitigating layers may be formed using techniques that control intrinsic film stresses (e.g., vacuum deposition) in the crack mitigating layer (relative to, for example, some sol-gel coating processes). The control of intrinsic film stresses may also enable control over other mechanical properties such as strain-to-failure of the crack mitigating layer.

Porosity and mechanical properties of the crack mitigating layer can be controlled using careful control of deposition methods such as a slight overpressure of gas in the vacuum chamber, low temperature deposition, deposition rate control, and plasma and/or ion-beam energy modification. Although vapor deposition methods are commonly used, other known methods can be used to provide a crack mitigating layer with the desired porosity and/or mechanical properties. For example, the crack mitigating layer including a nanoporous layer can also be formed by wet-chemistry or sol-gel methods, such as spin coating, dip coating, slot/slit coating, roller coating, gravure coating, and spray coating. Porosity can be introduced to wet-coated nanoporous layers by use of a pore former (such as a block copolymer pore former) which is later dissolved or thermally decomposed, phase separation methods, or the casting of a particulate or nanoparticulate layer where interstices between particles remain partially void.

In some embodiments the nanoporous layer may exhibit a similar refractive index to either the glass substrate and/or film and/or additional layers (as described herein), to minimize optical interference effects. Additionally or alternatively, the nanoporous layer may exhibit a refractive index that is tuned to achieve anti-reflective interference effects. The refractive index of the nanoporous layer can be engineered somewhat by controlling the nanoporosity of the nanoporous layer. For example, in some cases it may be desirable to choose a material with a relatively high refractive index, such as $Al_2O_3$, $TiO_2$, $Nb_2O_5$, $Si_3N_4$, or AlN, which when made into a nanoporous layer with a targeted porosity level can exhibit an intermediate refractive index in the range from about 1.4 to about 1.8 or a refractive index that approximates the glass substrate (e.g., in the range from about 1.45 to about 1.6). The refractive index of the nanoporous layer can be related to the porosity level using "effective index" models that are known in the art.

The thickness of the crack mitigating layer 130 may be in the range of about 0.01 μm to about 10 μm (10 nm to 10,000 nm) or in the range from about 0.04 μm to about 0.5 μm (40 nm to about 500 nm); however in some cases the film can be much thinner, for example, the crack mitigating layer 130 may be a single-molecule "monolayer" having a thickness of about 0.1 nm to about 2 nm. In one or more embodiments, the thickness of the crack mitigating layer 130 is in the range from about 0.02 μm to about 10 μm, from about 0.03 μm to about 10 μm, from about 0.04 μm to about 10 μm, from about 0.05 μm to about 10 μm, from about 0.06 μm to about 10 μm, from about 0.07 μm to about 10 μm, from about 0.08 μm to about 10 μm, from about 0.09 μm to about 10 μm, from about 0.1 μm to about 10 μm, from about 0.01 μm to about 9 μm, from about 0.01 μm to about 8 μm, from about 0.01 μm to about 7 μm, from about 0.01 μm to about 6 μm, from about 0.01 μm to about 5 μm, from about 0.01 μm to about 4 μm, from about 0.01 μm to about 3 μm, from about 0.01 μm to about 2 μm, from about 0.01 μm to about 1 micron, from about 0.02 μm to about 1 micron, from about 0.03 to about 1 μm, from about 0.04 μm to about 0.5 μm, from about 0.05 μm to about 0.25 μm or from about 0.05 μm to about 0.15 μm.

In one or more embodiments, thicknesses of the glass substrate 120, film 110 and/or crack mitigating layer 130 may be specified in relation to one another. For example, the crack mitigating layer may have a thickness that is less than or equal to about 10 times the thickness of the film. In another example, where a film 110 has a thickness of about 85 nm, the crack mitigating layer 130 may have a thickness of about 850 nm or less. In yet another example, the thickness of the crack mitigating layer 130 may be in the range from about 35 nm to about 80 nm and the film 110 may have a thickness in the range from about 30 nm to about 300 nm. In one variant, the crack mitigating layer may have a thickness that is less than or equal to about 9 times, 8 times, 7 times, 6 times, 5 times, 4 times, 3 times or two times the thickness of the film. In another variant, the thickness of the film and the thickness of the crack mitigating film are each less than about 10 μm, less than about 5 μm, less than about 2 μm, less than about 1 less than about 0.5 μm, or less than about 0.2 μm. The ratio of the crack mitigating layer 130 thickness to the film 110 thickness may be, in some embodiments, in the range from about 1:1 to about 1:8, in the range from about 1:2 to about 1:6, in the range from about 1:3 to about 1:5, or in the range from about 1:3 to about 1:4. In another variant, the thickness of the crack mitigating layer is less than about 0.1 μm and the thickness of the film is greater than the crack mitigating layer.

One or more embodiments of the article include a crack mitigating layer 130 comprising polyimide. In such embodiments, when the crack mitigating layer 130 is utilized, the film 110 maintains functional properties (e.g., electrical conductivity) and the article 100 retains its average flexural strength. In such embodiments, the film 110 may include one or more transparent conductive oxide layers, such as indium-tin-oxide layers. In addition, the glass substrate 120 may be strengthened, or more specifically, chemically strengthened. In these embodiments, use of polyimide or other high-temperature-tolerant polymers as components of the crack mitigating layer may be preferred because these high-temperature-tolerant polymers can withstand the sometimes harsh vacuum deposition conditions of certain films, an important factor in enabling the desired film properties to be maintained.

Additionally or alternatively, the film 110 comprising indium-tin-oxide and the crack mitigating layer 130 comprising polyimide form a stack, wherein the stack has an overall low optical reflectance. For example, the overall (or total) reflectance of such a stack may be 10% or less, 8% or less, 7% or less, 6.5% or less, 6% or less, 5.5% or less across a visible wavelength range from 450-650 nm, 420-680 nm, or even 400-700 nm. The reflectance numbers above are quoted including the reflectance from one external bare (or uncoated) glass interface, as shown in the optical reflectance simulations of FIGS. 10, 11, and 12, which is approximately 4% reflectance from the external uncoated glass interface alone, and for a specific embodiment where a polyimide crack mitigating layer 130 and an indium-tin-oxide film 110 are covered by some encapsulation or adhesive layer. Thus, the reflectance from this film stack structure and film-glass coated interfaces alone (subtracting out the reflectance of the external, uncoated glass interface) is less than about 5%, 4%, 3%, 2%, or even less than about 1.5% across a visible wavelength range from 450-650 nm, 420-680 nm, or even 400-700 nm, when covered by a typical encapsulant (i.e. an additional film or layer) having an encapsulant refractive index of about 1.45-1.65. In addition, the stack structure may exhibit a high optical transmittance, which indicates both low reflectance and low absorptance, according to the general relationship: Transmittance=100%−Reflectance−Absorptance. The transmittance values for the stack structure (when neglecting reflectance and absorptance associated with the glass substrate or encapsulant layers alone) may be greater than about 75%, 80%, 85%, 90%, 95%, or even 98% across a visible wavelength range from 450-650 nm, 420-680 nm, or even 400-700 nm, when covered by a typical encapsulant (i.e. an additional film or layer) having an encapsulant refractive index of about 1.45-1.65.

One or more embodiments of the article include a crack mitigating layer 130 comprising nanoporous, vapor-deposited $SiO_2$. In such embodiments, when the crack mitigating layer 130 is utilized, the film 110 maintains functional properties (e.g., electrical conductivity) and the article 100 retains its average flexural strength, or has an improved average flexural strength relative to a similar article comprising film 110 and glass substrate 120 without the crack mitigating layer 130. In such embodiments, the film 110 may include one or more transparent conductive oxide layers, such as indium-tin-oxide layers. In addition, the glass substrate 120 may be strengthened, or more specifically, chemically strengthened. In these embodiments, use of an inorganic, nanoporous crack-mitigating layer may be utilized for some applications because of the temperature, vacuum, and environmental tolerance factors mentioned elsewhere herein.

Polymeric or organic-inorganic hybrid materials can be employed in the crack mitigating layer 130 where it is desirable for the crack mitigating layer 130 to have ductile properties or to be plastically deformable, with or without porosity. In addition, the crack mitigating layer 130 may include ductile metal films such as Al or Cu.

In some embodiments a useful measure of tendency towards plastic deformation is the elongation at break (expressed as a "%" or a "strain value"). In these embodiments the crack mitigating layer 130 may be ductile or plastically deformable and may include material that exhibits an elongation at break, in terms of strain value, greater than about 1%, greater than 2%, greater than 5%, or even greater than 10%. The crack mitigating layer 130 may have a higher elongation to break than the film 110. Exemplary materials for use in crack mitigating layers 130 that are ductile or plastically deformable include a variety of metals and polymers, including organic-inorganic hybrids, materials listed above including, but not limited to, polyimides, PTFE (polytetrafluoroethylene), PES (polyethersulfone), PEI (polyetherimide), PPSU (polyphenylsulfone), PVDF (polyvinylidine difluoride), polyesters, and similar materials known in the art. In instances where a ductile or plastically deformable crack mitigating layer 130 is utilized, the crack mitigating layer 130 may also have a high toughness. For example, the crack mitigating layer 130 may have a fracture toughness of 0.5 MPa·m$^{1/2}$ or greater, or in some cases 5 MPa·m$^{1/2}$ or greater. The crack mitigating layer may also have a high critical strain energy release rate, with values as listed hereinabove.

The optical properties of the article 100 may be adjusted by varying one or more of the properties of the film 110, crack mitigating layer 130 and/or the glass substrate 120. For example, the article 100 may exhibit a total reflectance of 10% or less, 8% or less, 7% or less, 6.9% or less, 6.8% or less, 6.7% or less, 6.6% or less, 6.5% or less, 6.4% or less, 6.3% or less, 6.2% or less, 6.1% or less and/or 6% or less, over the visible wavelength range from about 400 nm to about 700 nm. Ranges may further vary as specified hereinabove, and ranges for the film stack/coated glass interfaces alone are listed hereinabove. In more specific embodiments, the article 100 described herein, may exhibit a lower average reflectance and greater average flexural strength than articles without a crack mitigating layer 130. In one or more alternative embodiments, at least two of optical properties, electrical properties or mechanical properties of the article 100 may be adjusted by varying the thickness(es) of the glass substrate 120, film 110 and/or the crack mitigating layer 130. Additionally or alternatively, the average flexural strength of the article 100 may be adjusted or improved by modifying the thickness(es) of the glass substrate 120, film 110 and/or the crack mitigating layer 130.

The article 100 may include one or more additional films disposed on the glass substrate. In one or more embodiments, the one or more additional films may be disposed on the film 110 or on the opposite major surface from the film. The additional film(s) may be disposed in direct contact with the film 110. In one or more embodiments, the additional film(s) may be positioned between: 1) the glass substrate 120 and the crack mitigating layer 130; or 2) the crack mitigating layer 130 and the film 110. In one or more embodiments, both the crack mitigating layer 130 and the film 110 may be positioned between the glass substrate 120 and the additional film(s). The additional film(s) may include a protective layer, an adhesive layer, a planarizing layer, an anti-splintering layer, an optical bonding layer, a display layer, a polarizing layer, a light-absorbing layer, reflection-modifying interference layers, scratch-resistant layers, barrier layers, passivation layers, hermetic layers, diffusion-blocking layers and combinations thereof, and other layers known in the art to perform these or related functions. Examples of suitable protective or barrier layers include layers containing $SiO_x$, $SiN_y$, $SiO_xN_y$, other similar materials and combinations thereof. Such layers can also be modified to match or complement the optical properties of the film 110, the crack mitigating layer 130 and/or the glass substrate 120. For example, the protective layer may be selected to have a similar refractive index as the crack mitigating layer 130, the film 110, or the glass substrate 120. It will be apparent to those of ordinary skill in the art that multiple additional film(s) with varying refractive indices and/or thicknesses can be inserted for various reasons. The refractive indices, thicknesses and other properties of the additional films (as well as the crack mitigating layer 130 and the film 110) may be further modified and optimized, without departing from the spirit of the disclosure. In other cases, for example, alternate film designs can be employed where the crack mitigating layer 130 may have a higher refractive index than the film. In other cases, the crack mitigating layer 130 may be engineered to have even lower elastic modulus or greater ductility or plasticity than the embodiments and examples disclosed herein.

In one or more embodiments, the articles 100 described may be used in information display devices and/or touch-sensing devices. In one or more alternative embodiments, the article 100 may be part of a laminate structure, for example as a glass-polymer-glass laminated safety glass to be used in automotive or aircraft windows. An exemplary polymer material used as an interlayer in these laminates is PVB (Polyvinyl butyral), and there are many other interlayer materials known in the art that can be used. In addition, there are various options for the structure of the laminated glass, which are not particularly limited. The article 100 may be curved or shaped in the final application, for example as in an automotive windshield, sunroof, or side window. The thickness of the article 100 can vary, for either design or mechanical reasons; for example, the article 100 can be thicker at the edges than at the center of the article. The article 100 may be acid polished or otherwise treated to remove or reduce the effect of surface flaws.

Another aspect of the present disclosure pertains to touch-sensing devices including the articles described herein. In one or more embodiments, the touch sensor device may include a glass substrate 120 (which may be strengthened or not strengthened), a film 110 comprising a transparent conductive oxide and a crack mitigating layer 130. The transparent conductive oxide may include indium-tin-oxide, aluminum-zinc-oxide, fluorinated tin oxide, or others known in the art. In one or more embodiments, the film 110 is discontinuously disposed on the glass substrate 120. In other words, the film 110 may be disposed on discrete regions of the glass substrate 120. The discrete regions with the film form patterned or coated regions (not shown), while the discrete regions without the film form unpatterned or uncoated regions (not shown). In one or more embodiments, the patterned or coated regions and unpatterned or uncoated regions are formed by disposing the film 110 continuously on a surface of the glass substrate 120 and then selectively etching away the film 110 in the discrete regions so that there is no film 110 in those discrete regions. The film 110 may be etched away using an etchant such as HCl or $FeCl_3$ in aqueous solutions, such as the commercially available TE-100 etchant from Transene Co. In one or more embodiments, the crack mitigating layer 130 is not significantly degraded or removed by the etchant. Alternatively, the film 110 may be selectively deposited onto discrete regions of a surface of the glass substrate 120 to form the patterned or coated regions and unpatterned or uncoated regions.

In one or more embodiments, the uncoated regions have a total reflectance that is similar to the total reflectance of the coated regions. In one or more specific embodiments, the unpatterned or uncoated regions have a total reflectance that differs from the total reflectance of the patterned or coated regions by about 5% or less, 4.5% or less, 4% or less, 3.5% or less, 3% or less, 2.5% or less, 2.0% or less, 1.5% or less or even 1% or less across a visible wavelength in the range from about 450 nm to about 650 nm, from about 420 nm to about 680 nm or even from about 400 nm to about 700 nm.

In accordance with another aspect of the present disclosure, articles 100 including both a crack mitigating layer 130 and a film 110, which may include indium-tin-oxide or other transparent conductive oxides, exhibit resistivity that is acceptable for use of such articles in touch sensing devices. In one or more embodiments, the films 110, when present in the articles disclosed herein, exhibit a sheet resistance of about 100 ohm/square or less, 80 ohm/square or less, 50 ohm/square or less, or even 30 ohm/square or less. In such embodiments, the film may have a thickness of about 200 nm or less, 150 nm or less, 100 nm or less, 80 nm or less, 50 nm or less or even 35 nm or less. In one or more specific embodiments, such films, when present in the article, exhibit a resistivity of $10 \times 10^{-4}$ ohm-cm or less, $8 \times 10^{-4}$ ohm-cm or less, $5 \times 10^{-4}$ ohm-cm or less, or even $3 \times 10^{-4}$ ohm-cm or less. Thus, the films 110, when present in the articles 100 disclosed herein can favorably maintain the electrical and optical performance expected of transparent conductive oxide films and other such films used in touch sensor applications, including projected capacitive touch sensor devices.

The disclosure herein can also be applied to articles which have articles that are not interactive or for display; for example, such articles may be used in a case in which a device has a glass front side that is used for display and can be interactive, and a back side that might be termed "decorative" in a very broad sense, meaning that backside can be "painted" some color, have art work or information about the manufacturer, model and serial number, texturing or other features.

Another aspect of the present disclosure pertains to a method of forming an article 100. In one or more embodiments, such methods include providing a glass substrate 120, disposing a crack mitigating layer 130 on a surface (e.g., one or more of the major surfaces 122, 124 and/or one or more minor surfaces) of the glass substrate 120, disposing a film 110 on the crack mitigating layer 130, such that the crack mitigating layer 130 is disposed between the film 110 and the glass substrate 120. In one or more embodiments, the method includes disposing the film 110 and/or the crack mitigating layer 130 via a vacuum deposition process. In particular embodiments, such vacuum deposition processes may utilize temperatures of at least about 100° C., 200° C., 300° C., 400° C. and all ranges and sub-ranges therebetween. In some embodiments, the crack mitigating layer may be formed by wet process, as described herein. In one or more embodiments, the method includes providing a crack mitigating layer solution that is diluted with a solvent thinner. In one or more embodiments, the method includes diluting the crack mitigating layer solution in a 50:50, 40:60, 30:70 or 20:80 ratio with a solvent thinner, or forming a polymer/solvent mixture comprising 30 wt %, 20 wt %, 10 wt %, 5 wt %, 2 wt %, 1 wt %, or 0.1 wt % of polymer, and all ranges and sub-ranges there between. The diluted crack mitigating layer may be applied to the glass substrate by various wet process methods known in the art.

In one or more specific embodiments, the method includes controlling the thickness(es) of the crack mitigating layer 130 and/or the film 110. Controlling the thickness(es) of the films disclosed herein may be performed by controlling one or more processes for forming the films so that the films are applied having a desired or defined thickness. In an even more specific embodiment, the method includes controlling the thickness(es) of the crack mitigating layer 130 and/or the film 110 to maintain the average flexural strength of the glass substrate 120 and/or the functional properties of the film 110.

In one or more embodiments, the method may include creating porosity in the crack mitigating layer 130. The method may optionally include controlling the porosity of the crack mitigating layer as otherwise described herein. The method may further include controlling the intrinsic film stresses of the crack mitigating layer and/or the film through control of deposition and fabrication processes of the crack mitigating layer.

The method may include disposing an additional film on the glass substrate 120. In one or more embodiments, the method may include disposing the additional film on the glass substrate such that the additional film is disposed between the glass substrate 120 and the crack mitigating layer 130, between the crack mitigating layer 130 and the film 110 or, such that the film 110 is between the crack mitigating layer 130 and the additional film. Alternatively, the method may include disposing the additional film on the opposite major surface of the glass substrate 120 from the surface on which the film is disposed. The additional film may include a protective layer, an adhesive layer, a planarizing layer, an anti-splintering layer, an optical bonding layer, a display layer, a polarizing layer, a light-absorbing layer, reflection-modifying interference layers, scratch-resistant layers, barrier layers, passivation layers, hermetic layers, diffusion-blocking layers, or combinations thereof.

In one or more embodiments, the method includes strengthening the glass substrate 120 before or after disposing the crack mitigating layer 130, film 110 and/or an additional film on the glass substrate. The glass substrate 120 may be strengthened chemically or otherwise. The glass substrate 120 may be strengthened after disposing the crack mitigating layer 130 on the glass substrate 120 but before disposing the film 110 on the glass substrate. The glass substrate 120 may be strengthened after disposing the crack mitigating layer 130 and the film 110 on the glass substrate 120 but before disposing an additional film (if any) on the glass substrate. Where no additional film is utilized, the glass substrate 120 may be strengthened after disposing the crack mitigating layer 130 and the film 110 on the glass substrate.

The following examples represent certain non-limiting embodiments of the disclosure.

Examples 1A-1J

Examples 1A-1J include articles according to one or more embodiments of the present disclosure or glass substrates of the prior art. Each of Examples 1A-1J utilized glass substrates that included a composition of 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; 0 mol %≤CaO≤3 mol %, and 0 mol %≤$SnO2$≤1 mol %. The glass substrates had a thickness of 0.7 mm. In Examples 1A-1E, the glass substrates were strengthened by ion exchange to provide a surface compressive stress (CS) of about 690 MPa and a compressive depth of layer (DOL) of about 23 μm. The glass substrate of Example 1F was not strengthened by ion exchange. In Examples 1G-1J, the strengthened glass substrates were strengthened by ion exchange to provide a surface compressive stress of about 740 MPa and a compressive depth of layer of about 44 μm. A crack mitigating layer comprising polyimide and/or a film comprising indium-tin-oxide were disposed on the strengthened glass substrates and (non-strengthened) glass substrates as provided below in Table 1. Examples 1A, 1E, 1F, 1G and IH are indicated as comparative because they did not include a crack mitigating layer.

TABLE 1

Examples 1A-1J.

| Example | Glass Substrate | Surface CS/ Compressive DOL | Crack Mitigating Layer (polyimide) | Film (indium-tin-oxide) |
|---|---|---|---|---|
| 1A (comparative) | Strengthened | 690 MPa/23 μm | none | None |
| 1B | Strengthened | 690 MPa/23 μm | 155 nm | 85 nm |
| 1C | Strengthened | 690 MPa/23 μm | 220 nm | 85 nm |
| 1D | Strengthened | 690 MPa/23 μm | 290 nm | 85 nm |
| 1E (comparative) | Strengthened | 690 MPa/23 μm | None | 85 nm |
| 1F (comparative) | Not strengthened | — | None | 85 nm |
| 1G (comparative) | Strengthened | 740 MPa/44 μm | None | None |
| 1H (comparative) | Strengthened | 740 MPa/44 μm | None | 85 nm |
| 1I | Strengthened | 740 MPa/44 μm | 490 nm | 85 nm |
| 1J | Strengthened | 740 MPa/44 μm | 45 nm | 85 nm |

For the Examples including a strengthened glass substrate (i.e., Examples 1A-1E and 1G-1J), the ion-exchange process was carried out by immersing the glass substrate in a molten potassium nitrate ($KNO_3$) bath that was heated to a temperature in the range from about 350° C. to 450° C. The glass substrates were immersed in the bath for a duration of 3-8 hours to achieve the surface CS and compressive DOL provided in Table 1. After completing the ion exchange process, the glass substrates of Examples 1A-1E and 1G-1J were cleaned in a 1-4% concentration KOH detergent solution, supplied by Semiclean KG, having a temperature of 50-70° C. The detergent solution was ultrasonically agitated at 40-110 KHz. The strengthened glass substrates were then rinsed in DI water, which was also ultrasonically agitated at 40-110 KHz and thereafter dried. Example 1F was also cleaned, rinsed and dried in the same manner as Examples 1A-1E and 1G-1J. In the Examples 1B-1D, 1I, and 1J where a crack mitigating layer was utilized, the following procedure was employed. Prior to disposing the crack mitigating layer, the strengthened glass substrates were then baked for 10 minutes on a hot plate at a temperature of 130° C., and then removed to cool for about 2 minutes.

An aminosilane-based adhesion promoter (supplied by HD Microsystems under the name VM-652) was applied to the strengthened and glass substrates and allowed to remain in the wet state for 20 seconds. The adhesion promoter was spun off the strengthened glass substrates, by spinning the glass substrate and the adhesion promoter applied thereon in a standard vacuum-chuck spin coater at 5000 RPM. After application of the adhesion promoter, a solution of polyimide (supplied by HD Microsystems under the name PI-2555) previously diluted with a solvent thinner comprising N-methyl-2-pyrrolidone (supplied by HD Microsystems under the name T9038/9), using various volume ratios as set out below, was applied to the strengthened glass substrates. About 1 mL of the polymer solution was applied to each glass sample measuring 50×50 mm square. The strengthened glass substrates with the polyimide solution were then spun at 500 RPM for 3-5 seconds, followed by subsequent rotation of 500-5000 RPM for 30-90 seconds, followed by an optional final rotation step at 5000 RPM for 15 seconds, to obtain the desired thickness and/or concentration of the crack mitigating layer. Example 1B had a polyimide thickness of 155 nm and was prepared using polyimide solution diluted in a 30:70 ratio with the solvent thinner and was spun first at a rotation of 500 RPM for 3 seconds, followed by a subsequent rotation at 4000 RPM for 60 seconds. Example 1C had a polyimide thickness of 220 nm and was prepared using polyimide solution diluted in a 30:70 ratio with the solvent thinner and was spun first at a rotation of 500 RPM for 3 seconds, followed by a subsequent rotation at 1500 RPM for 90 seconds. Example 1D had a polyimide thickness of 290 nm and was prepared using polyimide solution diluted in a 40:60 ratio with the solvent thinner and was spun first at a rotation of 500 RPM for 3 seconds, followed by a subsequent rotation at 1000 RPM for 90 seconds. For examples 1B-1D, the polymer solutions were applied and spin coated on the glass substrates when the solutions were at a temperature of about 15° C., which tends to slow the evaporation of the solvent and yield somewhat thinner films than with a higher temperature solution. Example 1I had a polyimide thickness of 490 nm and was prepared using polyimide solution diluted in a 50:50 ratio with the solvent thinner and was spun first at a rotation of 500 RPM for 5 seconds, followed by a subsequent rotation at 1500 RPM for 45 seconds, followed by a final rotation at 5000 RPM for 15 seconds. Example 1J had a polyimide thickness of 45 nm and was prepared using polyimide solution diluted in a 20:80 ratio with the solvent thinner and was spun first at a rotation of 500 RPM for 5 seconds, followed by a subsequent rotation at 2000 RPM for 30 seconds, followed by a final rotation at 5000 RPM for 15 seconds. For examples 1I and 1J, the polymer solutions were allowed to equilibrate at room temperature (i.e., about 25° C.) for at least one hour before applying and spin coating the solutions on the glass substrates.

Immediately after the spin coating steps as outline above, the Examples containing a crack mitigating layer were then dried and baked on a hot plate at a temperature of 130° C. for 2-3 minutes and then placed in an $N_2$ curing oven (supplied by YES) operating at a pressure of 280 torr and cured at a temperature of 240° C. for 90 minutes. Based on known data and information obtained by testing, the resulting crack mitigating layer had an elastic modulus of about 2.5 GPa to about 10 GPa and an elongation to break of about 10% after curing.

An indium-tin-oxide-containing film was applied to the Examples, as indicated in Table 1. The indium-tin-oxide film was sputtered from an oxide target, using a system supplied by KDF, under the name model 903i. The sputtering target was also supplied by KDF and included $SnO_2$ and $In_2O_3$ present at a ratio of 10:90 by weight. The film was sputtered at a pressure of 10 mTorr in the presence of oxygen flowed at a rate of about 0.5 sccm and argon flowed at a rate of 30 sccm, with DC power supplied at 600 W. After the film was disposed, as indicated in Table 1, the Examples were annealed at a temperature of about 200° C. for 60 minutes in air. For the Examples which did not include a crack-mitigating film (i.e., Examples 1E, 1F, and 1H), the glass substrate was pre-treated, before deposition of the film using a plasma cleaning step in the same KDF system, where the plasma cleaning step employed 15 mTorr pressure, 50 sccm of Argon flow, 5 sccm of oxygen flow, and 400 W of RF power for 1 minute.

Figure 5:
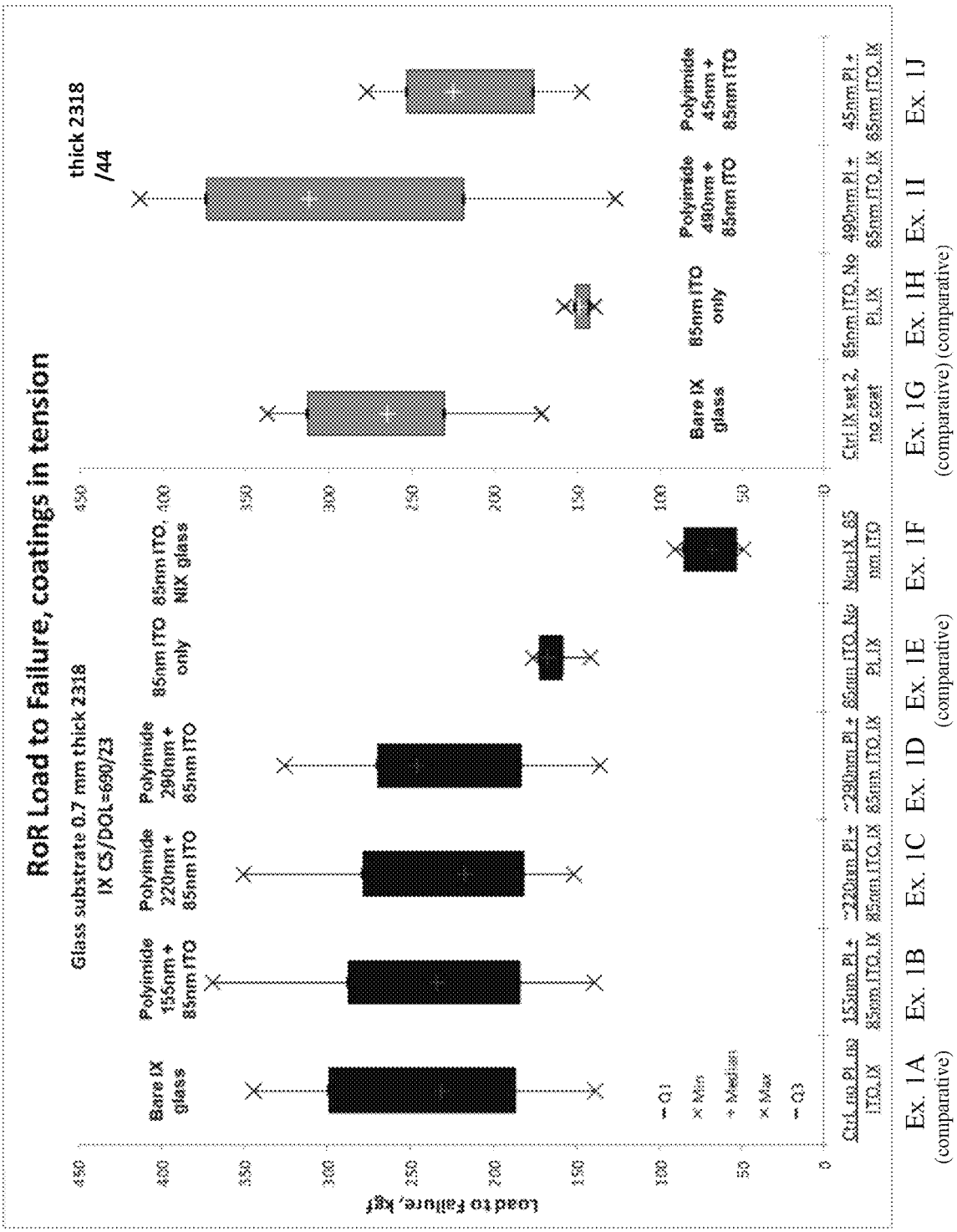
FIG. 5 is a graph presenting ring-on-ring load-to-failure performance of glass substrates or articles according to Examples 1A-1J.

To demonstrate the retention of average flexural strength of the articles and strengthened glass substrates of Examples 1A-1J, the articles and glass substrates were tested using ring-on-ring load to failure testing, as shown in FIG. 5. For ring-on-ring load to failure testing, Examples 1B-1F and 1H-1J (with the film and/or crack mitigating layer) were tested with the side with the film and/or crack mitigating layer in tension. For Examples 1A and 1G (without a film or crack mitigating layer), one side of the strengthened glass substrate was similarly in tension. The ring-on-ring load to failure testing parameters included a contact radius of 1.6 mm, a cross-head speed of 1.2 mm/minute, a load ring diameter of 0.5 inches, and a support ring diameter of 1 inch. Before testing, an adhesive film was placed on both sides of the articles and strengthened glass substrates to contain broken glass shards.

As illustrated in FIG. 5, the addition of a crack mitigating layer including polyimide, having a thickness in the range from about 45 nm to about 490 nm, resulted in articles that retained about the same average flexural strength as glass substrates without a crack mitigating layer or film. Moreover, the articles with a crack mitigating layer exhibited greater average flexural strength than the strengthened and non-strengthened glass substrates with only a film. For comparison, the strengthened and non-strengthened glass substrates with only a film disposed thereon (i.e., Examples 1E, 1F and 1H) exhibited a substantial reduction in the average flexural strength.

Examples 2A-2D

Each of Examples 2A-2D utilized glass substrates that included a composition of 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; 0 mol %≤CaO≤3 mol %, and 0 mol %≤$SnO2$≤1 mol %. The glass substrates had a thickness of 0.7 mm and were strengthened by ion exchange and prepared for combination with a crack mitigating layer and/or film, using the same processes as described with reference to Examples 1A-1J. The strengthened glass substrates of Examples 2A-2D had a surface compressive stress (CS) of about 776 MPa and a compressive depth of layer (DOL) of about 41.4 μm. A crack mitigating layer comprising polyimide and a film comprising indium-tin-oxide were disposed on the strengthened glass substrates as provided below in Table 2, using the methods described with reference to Examples 1A-1J to provide the articles of Examples 2A-2D. An adhesion promoter was utilized in the same manner as Examples 1B-1D, 1I, and 1J. Example 2A had a polyimide thickness of 250 nm and was prepared using polyimide solution diluted in a 30:70 volume ratio with the solvent thinner and was spun first at a rotation of 500 RPM for 3 seconds, followed by a subsequent rotation at 4000 RPM for 60 seconds. Example 2B had a polyimide thickness of 90 nm and was prepared using polyimide solution diluted in a 20:80 volume ratio with the solvent thinner and was spun first at a rotation of 500 RPM for 3 seconds, followed by a subsequent rotation at 4000 RPM for 60 secondsonds. For examples 2A and 2B, the polymer solutions were allowed to equilibrate at room temperature (~25 C) for at least one hour before applying and spin coating the solutions on the glass substrates. Drying, baking and curing for these polyimide-coated samples was carried out in the same manner as examples 1B-1D, 1I, and 1J. Examples 2C and 2D are indicated as comparative because they did not include a crack mitigating layer.

TABLE 2

Examples 2A-2D.

| Example | Crack mitigating layer (polyimide) | Film (indium-tin-oxide) |
| --- | --- | --- |
| 2A | 250 nm | 85 nm |
| 2B | 90 nm | 85 nm |
| 2C (comparative) | None | 85 nm |
| 2D (comparative) | None | None |

For ball drop height-to-failure testing, the articles of Examples 2A-2C (with the film and/or crack mitigating layer) were tested with the side with the film and/or crack mitigating layer in tension. For Example 2D, without a film or crack mitigating layer, one side of the strengthened glass substrate was similarly in tension. A steel ball having a weight of 128 g and diameter of 31.75 mm was utilized. The articles and the strengthened glass substrate each had a size of 50 mm×50 mm and were supported at each edge. Before testing, an adhesive film was placed on both sides of the articles and the strengthened glass substrate to contain broken glass shards.

Figure 6:
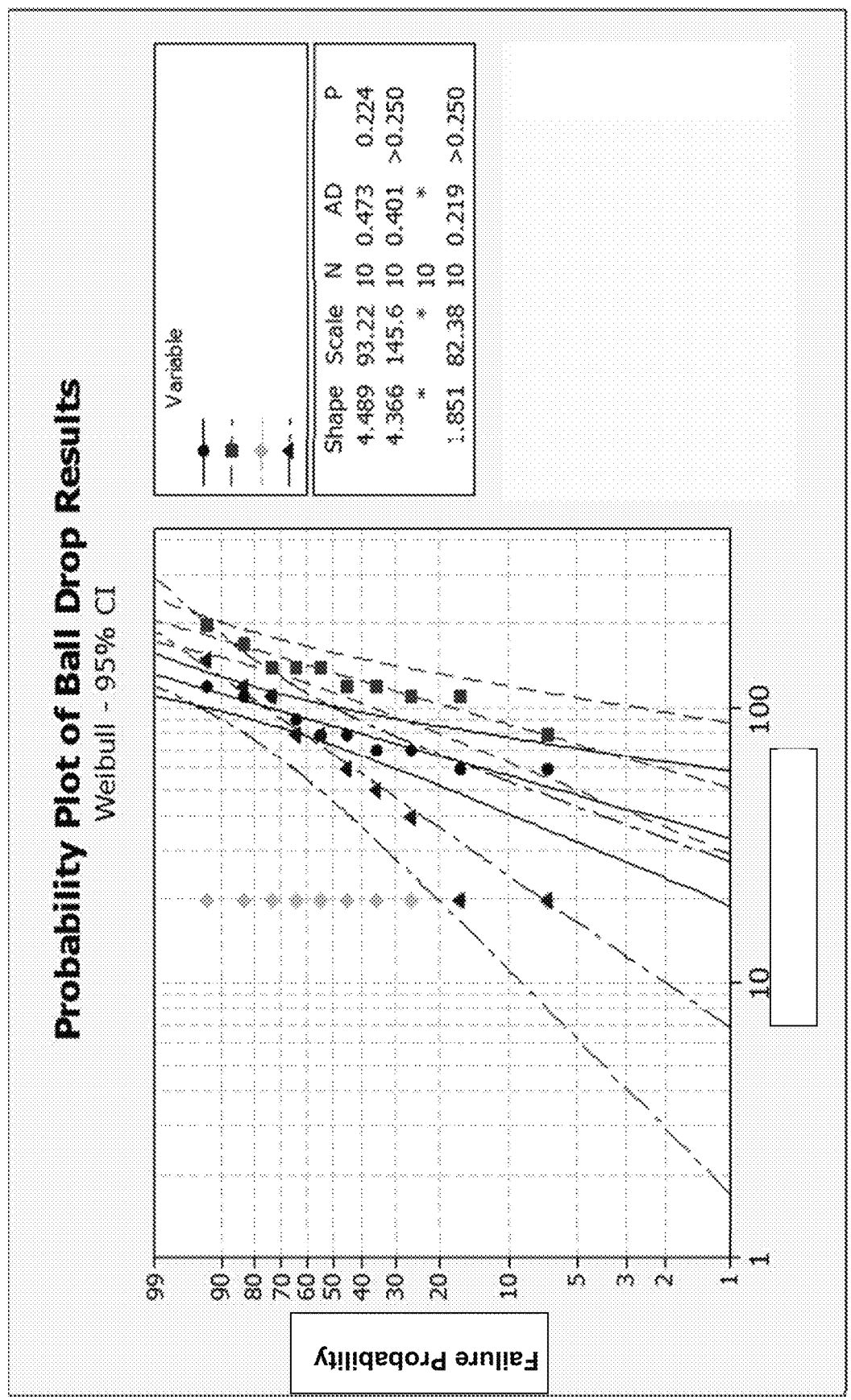
FIG. 6 is a probability plot of ball drop performance of glass substrates or articles according to Examples 2A-2D.

As illustrated in FIG. 6, the articles of Examples 2A and 2B exhibited the same or similar average flexural strength using ball-drop height to failure testing as the strengthened glass substrate of Example 2D, indicating that the articles including a crack mitigating layer retained their respective average flexural strength, while the articles with only a film (and no crack mitigating layer) (i.e., Example 2C) exhibited a significant reduction in or lower level average flexural strength.

Examples 3A-3C

Figure 7:
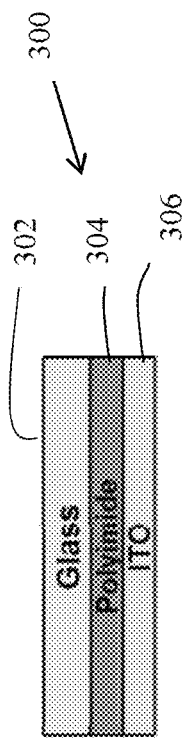
FIG. 7 is an illustration of an article according to Example 3A.
Figure 8:
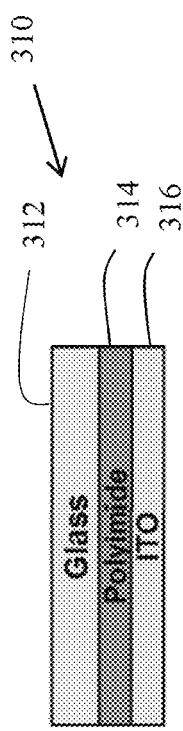
FIG. 8 is an illustration of an article according to Example 3B.
Figure 9:
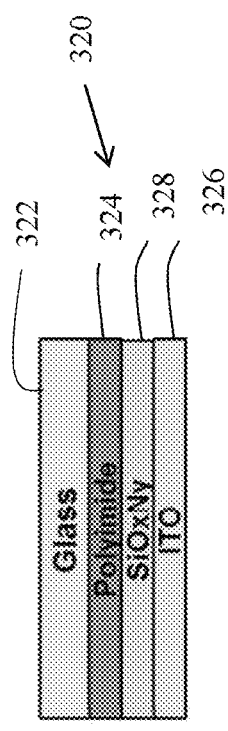
FIG. 9 is an illustration of an article according to Example 3C.
Figure 10:
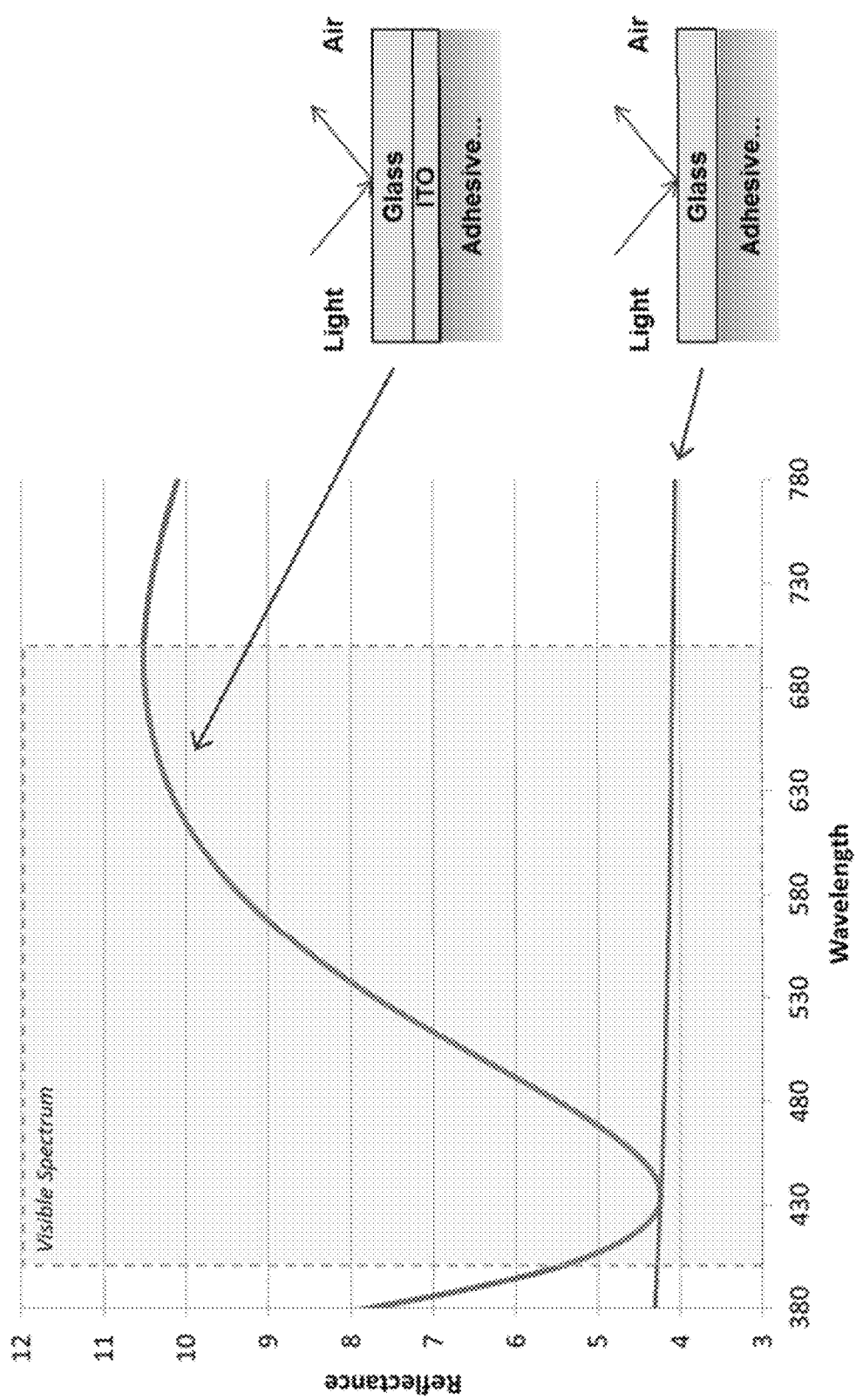
FIG. 10 is a modeled optical reflectance spectrum according to Comparative Examples 4A and 4B.
Figure 11:
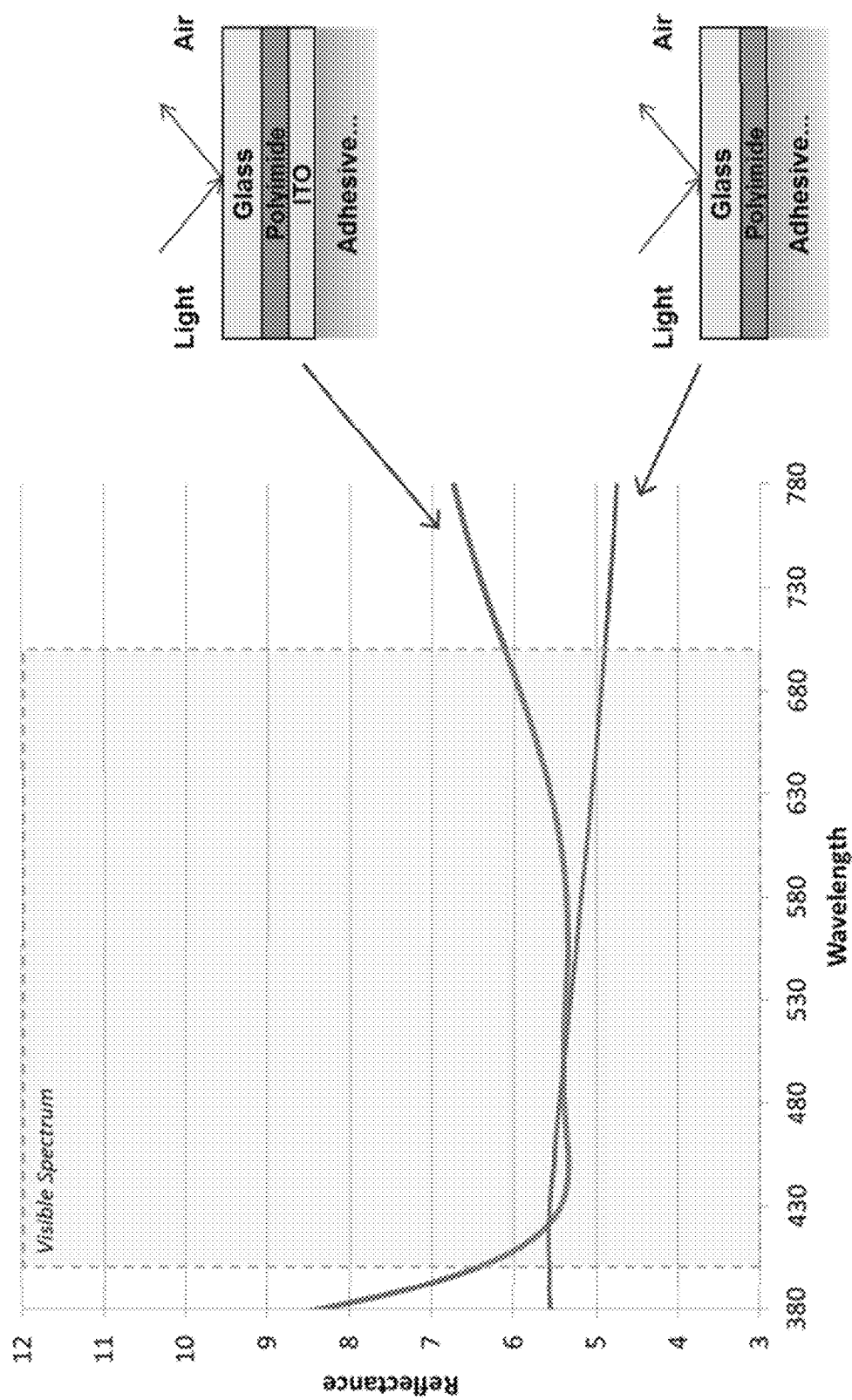
FIG. 11 is a modeled optical reflectance spectrum according to Example 4C and Example 4D.
Figure 12:
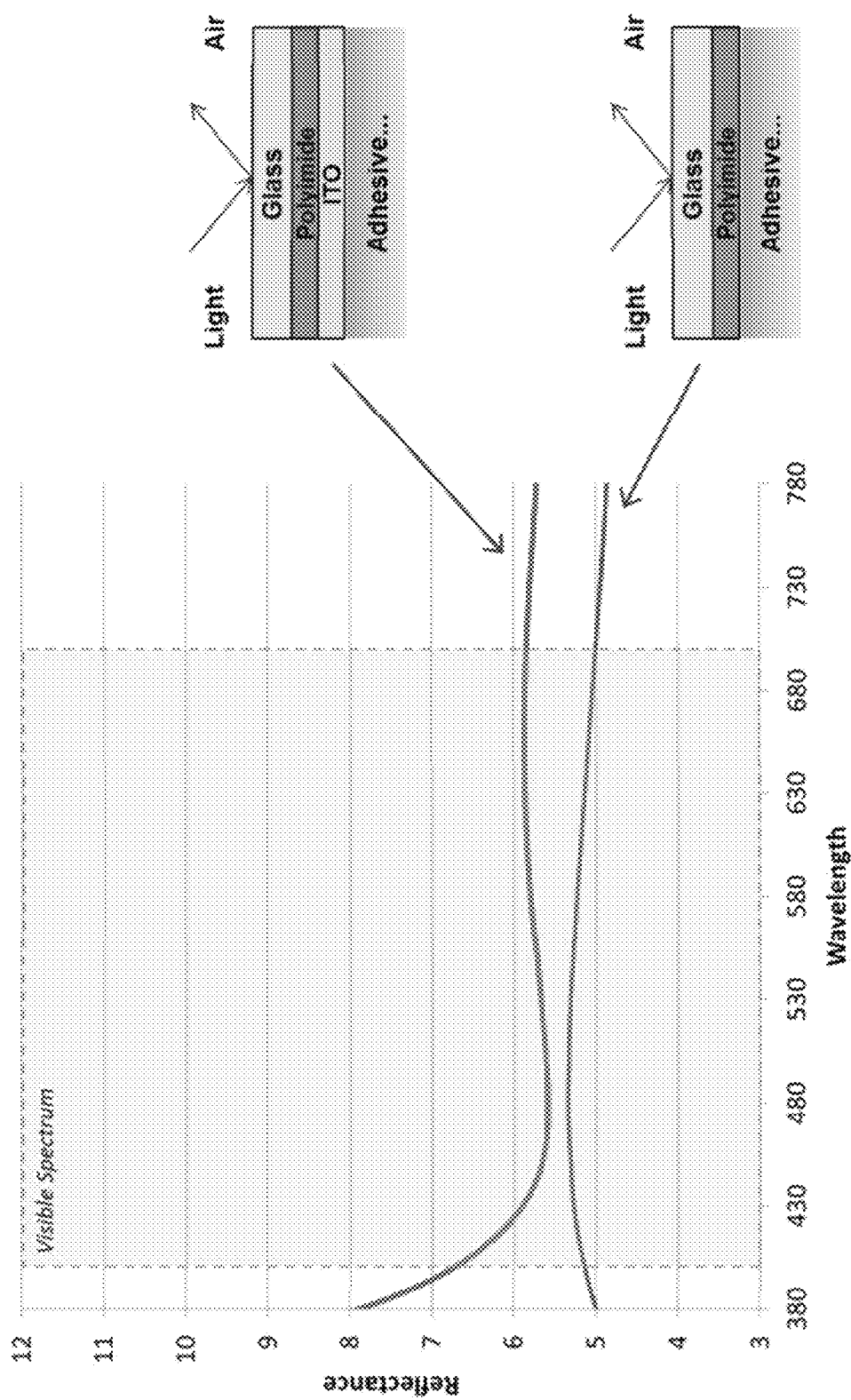
FIG. 12 is a modeled optical reflectance spectrum according to Example 4E and Comparative Example 4F.

Examples 3A-3C are prophetic examples that are illustrated in FIGS. 7-9, with related modeled optical reflectance data shown in FIGS. 10-12. Examples 3A and 3B correlate to Examples 4C and 4E, respectively, which are discussed below. Example 3A-3C include articles 300, 310, 320 each including a glass substrate 302, 312, 322, a crack mitigating layer 304, 314, 324 including polyimide disposed on the glass substrate 302, 312, 322 and a film 306, 316, 326 including indium-tin-oxide disposed on the glass substrate 302, 312, 322 such that the crack mitigating layer is between the glass substrate and the film. In each of Examples 3A-3C, the glass substrates have a thickness in the range from about 0.2 mm to about 2.0 mm. Example 3A includes a crack mitigating layer 304 having a thickness of 74 nm and a film 306 having a thickness of 115 nm. Example 3B includes a crack mitigating layer 314 having a thickness of 85 nm and a film 316 having a thickness of 23 nm. Example 3C includes a crack mitigating layer 324 having a thickness of 64 nm and a film 326 having a thickness of 115 nm. Example 3C includes an additional film 328 including $SiO_xN_y$, which functions as a protective layer, disposed between the crack mitigating layer 324 and the film 326. The additional film 328 has a thickness of 10 nm. In Examples 3A-3C, the glass substrates 302, 312, 322 have a refractive index in the range from about 1.45-1.55, the crack mitigating layers 304, 314, 324 have a refractive index in the range from about 1.6-1.75 and the films 306, 316, 326 have a refractive index in the range from about 1.8-2.2. In Example 3C, the additional film 328 including SiOxNy has a refractive index similar to the refractive index of the crack mitigating layer 324. Each of Examples 3A-3C may include a second additional film (illustrated in FIGS. 10, 11 and 12) that may include an adhesive, which will be more fully described in Modeled Example 4.

In each of the articles 300, 310, 320, the thicknesses of the crack mitigating layer and the film were optimized to simultaneously achieve good optical properties and good mechanical properties. The foregoing examples illustrate that the thickness range of crack mitigating layers and films used in the articles 300, 310, and 320 are effective to retain high average flexural strength for the article, while Modeled Examples 4C and 4E (described below) illustrate that the articles 300, 310, and 320 simultaneously achieve low optical reflectance. Optimization may be achieved by controlling or adjusting one or more process parameters discussed with reference to Examples 1A-1J.

Modeled Example 4

Examples 4C and 4E and Comparative Examples 4A, 4B, 4D and 4F were optically modeled using the following information in Table 3. Examples 4C and 4E correlate to Examples 3A and 3B.

The articles of Comparative Examples 4A and 4B were modeled using a glass substrate having a thickness of 1.0 mm and are illustrated in FIG. 10. In modeled Comparative Example 4A, a film having a thickness of 100 nm is disposed on the glass substrate and an additional film disposed on the film, such that the film is disposed between the glass substrate and the additional film, as illustrated in FIG. 10. In Comparative Example 4B, the model included the additional film being disposed on the glass substrate without an intervening film, as also illustrated in FIG. 10. The additional film of Examples 4A and 4B includes an adhesive having refractive index of about 1.52. In the optical model, the additional film/adhesive layer was treated as being "very thick", meaning it represents the exit ambient medium in the optical model, where air is the input ambient medium. This represents a practical case where reflectance from the distant back surface of the adhesive are not included in the model, because this back surface of the adhesive layer is laminated to additional light-absorbing structures such as polarizing layers, display layers, and device layers that absorb or scatter substantially all of the light that transmits into the adhesive layer. The adhesive represents one or more of a protective layer, a planarizing layer, an anti-splinter layer, or an optical bonding layer and other layers disclosed herein with reference to the additional film. As illustrated in FIG. 10, the presence of a high refractive index film, such as indium-tin-oxide, without a properly designed layer structure or crack mitigating layer, typically causes a significant increase in reflectance in the article, over the visible spectrum.

The articles of Example 4C and Example 4D were modeled using a glass substrate having a thickness of 1.0 mm and are illustrated in FIG. 11. In modeled Example 4C, a crack mitigating layer having a thickness of 74 nm and including polyimide is disposed on a surface of the glass substrate, a film comprising indium-tin-oxide and having a thickness of 115 nm is disposed on the crack mitigating layer and an additional film is disposed on the film. As illustrated in FIG. 11, the crack mitigating layer is disposed between the glass substrate and the film, and the film is disposed between the crack mitigating layer and the additional film. In Example 4D, the modeled article is identical to the modeled article of

TABLE 3

Refractive index (n,k) values versus wavelength (WL) used in the optical modeling designs, which are illustrated by FIGS. 10-12.

| Crack Mitigating Layer | | | Film | | | Glass Substrate | | | Additional Film | | |
|---|---|---|---|---|---|---|---|---|---|---|---|
| WL | n | k | WL | n | k | WL | n | k | WL | n | k |
| 350 | 1.781 | 0.000 | 350 | 2.28 | 0.03 | 300 | 1.532 | 0.000 | 250 | 1.578 | 0.000 |
| 400 | 1.742 | 0.000 | 400 | 2.2 | 0.005 | 450 | 1.517 | 0.000 | 300 | 1.553 | 0.000 |
| 450 | 1.719 | 0.000 | 450 | 2.15 | 0.003 | 550 | 1.512 | 0.000 | 350 | 1.539 | 0.000 |
| 500 | 1.703 | 0.000 | 500 | 2.11 | 0.003 | 700 | 1.507 | 0.000 | 400 | 1.531 | 0.000 |
| 550 | 1.693 | 0.000 | 550 | 2.07 | 0.003 | 1200 | 1.497 | 0.000 | 450 | 1.525 | 0.000 |
| 600 | 1.686 | 0.000 | 600 | 2.04 | 0.003 | | | 0.000 | 500 | 1.521 | 0.000 |
| 650 | 1.680 | 0.000 | 650 | 2.015 | 0.005 | | | | 550 | 1.519 | 0.000 |
| 700 | 1.676 | 0.000 | 700 | 1.995 | 0.007 | | | | 600 | 1.516 | 0.000 |
| 750 | 1.673 | 0.000 | 750 | 1.975 | 0.01 | | | | 650 | 1.515 | 0.000 |
| 850 | 1.670 | 0.000 | 850 | 1.94 | 0.02 | | | | 700 | 1.513 | 0.000 |
| 950 | 1.668 | 0.000 | 950 | 1.9 | 0.03 | | | | 750 | 1.512 | 0.000 |
| | | | 1150 | 1.84 | 0.05 | | | | 800 | 1.511 | 0.000 |
| | | | | | | | | | 850 | 1.510 | 0.000 |
| | | | | | | | | | 900 | 1.509 | 0.000 |
| | | | | | | | | | 950 | 1.508 | 0.000 |
| | | | | | | | | | 1000 | 1.508 | 0.000 |

Example 4C except no film is included, as illustrated in FIG. 11. The additional film of Example 4C and Example 4D includes an adhesive having refractive index of about 1.52. The adhesive is also characterized as being "very thick". The adhesive represents one or more of a protective layer, a planarizing layer, an anti-splinter layer, or an optical bonding layer and other layers disclosed herein with reference to the additional film. Such layers may be commonly used in touch screen devices. As illustrated in FIG. 11, the reflectance of an article with and without a film is similar over a majority of the visible spectrum. Accordingly, when compared to Comparative Example 4A, which showed the presence of a film significantly increasing the reflectance of an article without a crack mitigating layer, the crack mitigating layer abates any increase or variation of reflectance otherwise caused by the presence of the film. In addition, the article including a glass substrate, a film and a crack mitigating layer exhibits a total reflectance that is substantially similar to, that is, within 5%, 4.5%, 4%, 3.5%, 3%, 2.5%, 2%, 1.5% or even 1% of the reflectance of the same article without the film (which may still include the crack-mitigating layer), across the visible wavelength range such as from about 450 to about 650 nm, from about 420 nm to about 680 nm or even from about 400 nm to about 700 nm.

The total reflectance illustrated in FIG. 11 for both of the articles of Examples 4C and 4D (i.e., an article with and an article without a film) can be used to demonstrate the contrast between patterned or coated regions (i.e., regions with a film comprising a transparent conductive oxide) and non-patterned or uncoated regions (i.e., regions without a film) in a touch sensor. The touch sensor pattern simulated by Examples 4C and 4D (using the refractive index values provided in Table 3) is largely "invisible" due to the less than about 1.5% change in absolute reflectance level between the patterned or coated region (containing the film) and the unpatterned or uncoated region (containing no film) in a wavelength range from 450-650 nm. The articles of Examples 4C and 4D also have a low absolute reflectance level, with total reflectance less than about 6% over this same wavelength range. About 4% of the total reflectance comes from the front (uncoated) glass interface with air and less than 2% of the total reflectance comes from the coated side of the glass substrate (i.e., the crack mitigating layer, film and adhesive interfaces).

The articles of Example 4E and Comparative Example 4F were modeled in the same manner as Example 4C and Comparative Example 4D, respectively; however the crack mitigating layer (comprising polyimide) had a thickness of 85 nm and the film (comprising indium-tin-oxide) had a thickness of 23 nm. Example 4E included a glass substrate, a crack mitigating layer disposed on the glass substrate, a film disposed on the crack mitigating layer and an additional film disposed on the film. Comparative Example 4F is identical to Example 4E except it did not include the film. As illustrated in FIG. 12, the total reflectance of a glass-film substrate with and without a film is similar over a majority of the visible spectrum. Accordingly, when compared to Comparative Example 4A, which showed the presence of a film significantly increasing the total reflectance of the article without a crack mitigating layer, the presence of a crack mitigating layer abates any increase or variation of reflectance otherwise caused by the presence of a film. In other words, an article including a glass substrate, a film and a crack mitigating layer exhibits a total reflectance that is substantially similar to, that is, within 5%, 4.5%, 4%, 3.5%, 3%, 2.5%, 2%, 1.5%, or even 1% of the same article without a film.

Based on Example 3 and modeled Example 4, the articles disclosed herein may have a low absolute reflectance and a small change in reflectance (e.g. <1.5%) between regions containing a film and regions not containing a film, rendering a patterned touch sensor largely "invisible", as shown in FIGS. 11 and 12.

Refractive index values for the films and glass substrates used in the optical modeling of Example 4 were derived from experimental films, optical reflectometry, and estimates known in the literature. It will be apparent to those of ordinary skill in the art that these refractive index values can be modified based on material and process choices, requiring a complementary modification to the optimal film thicknesses specified here. In addition, it will be apparent to those of ordinary skill in the art that small modifications of the index values in Table 4 can be achieved through material and process changes, without departing from the spirit of the disclosure. Likewise, small changes in the film and substrate thicknesses and design can be utilized without departing from the spirit of the disclosure. Further, the crack mitigating layers in Example 3 and modeled Example 4 can be chosen to comprise additional materials having similar refractive indices, and in some cases may not include polyimide. For example, the crack mitigating layers in Examples 3 and 4 may comprise nanoporous inorganic layers, alternative polymer materials, or other materials mentioned elsewhere herein.

Example 5: Nanoporous Crack Mitigating Layer

Examples 5A-5G were made by providing 0.7 mm thick ion-exchange strengthened aluminosilicate glass substrates. The glass substrate included a composition of 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; 0 mol %≤CaO≤3 mol %, and 0 mol %≤$SnO2$≤1 mol %. The glass substrates were ion-exchanged in a $KNO_3$ molten salt bath having a temperature of about 350-450° C. for 3-8 hours. The ion-exchanged glass substrates had a compressive stress of about 687 MPa and an ion-exchange depth of layer of about 24 microns. The glass substrates were then cleaned in a KOH detergent solution (1-4% Semiclean KG), having a temperature of about 50-70° C. with ultrasonic agitation at 40-110 KHz, rinsed in DI water with ultrasonics in the same frequency range, and dried.

The glass substrate of Example 5A was left bare, with no layers or films disposed thereon. A nanoporous $SiO_2$ layer was deposited on each of the glass substrates of Examples 5B, 5C, 5F and 5G using resistive thermal evaporation of a SiO precursor material at a deposition rate of 5 angstroms/second, a deposition pressure of $7.3 \times 10^{-4}$ Torr, an oxygen flow rate of 100 sccm, an argon flow rate of 100 sccm, and a substrate temperature of initially about 25° C., which increased up to about 50° C. during deposition, due to the heat generated by the deposition process. The resulting nanoporous $SiO_2$ layer had a refractive index of 1.38 at 550 nm wavelength which leads to an estimated porosity of 21%. The nanoporous $SiO_2$ layer was measured to have an elastic modulus of 20 GPa using nanoindentation. Examples 5B and 5F included a nanoporous $SiO_2$ layer having a thickness of about 200 nm and Examples 5C and 5G included a nanoporous $SiO_2$ layer having a thickness of about 500 nm.

The glass substrates of Example 5D-5E (which did not include a nanoporous layer) and Examples 5F and 5G (which each included a nanoporous layer) were further coated with an indium-tin-oxide (ITO) film having a thickness of about 100 nm. The ITO films were formed using a sputtering process and a KDF, model 903i, ITO coating system. A sputtering target of SnO2:In2O3=10:90 (by weight), also supplied by KDF was utilized. The ITO films were sputtered at a pressure of 15 mtorr with 5 sccm flow of 90:10 mixed Ar:O2, 95 sccm Ar flow, and 1000 W DC power. After deposition, Examples 5E-5G were annealed at 200 C for 60 min in air. Example 5D was not annealed. Table 5 summarizes the attributes and processing of Examples 5A-5G.

TABLE 5

Examples 5A-5G.

| Example | Nanoporous SiO$_2$ Layer Thickness | ITO Film Thickness | Annealing Temperature | Annealing Time |
|---|---|---|---|---|
| Example 5A (comparative) | None | None | N/A | N/A |
| Example 5B (comparative) | 200 nm | None | N/A | N/A |
| Example 5C (comparative) | 500 nm | None | N/A | N/A |
| Example 5D (comparative) | None | 100 nm | None | N/A |
| Example 5E (comparative) | None | 100 nm | 200° C. | 60 min |
| Example 5F | 200 nm | 100 nm | 200° C. | 60 min |
| Example 5G | 500 nm | 100 nm | 200° C. | 60 min |

Figure 13:
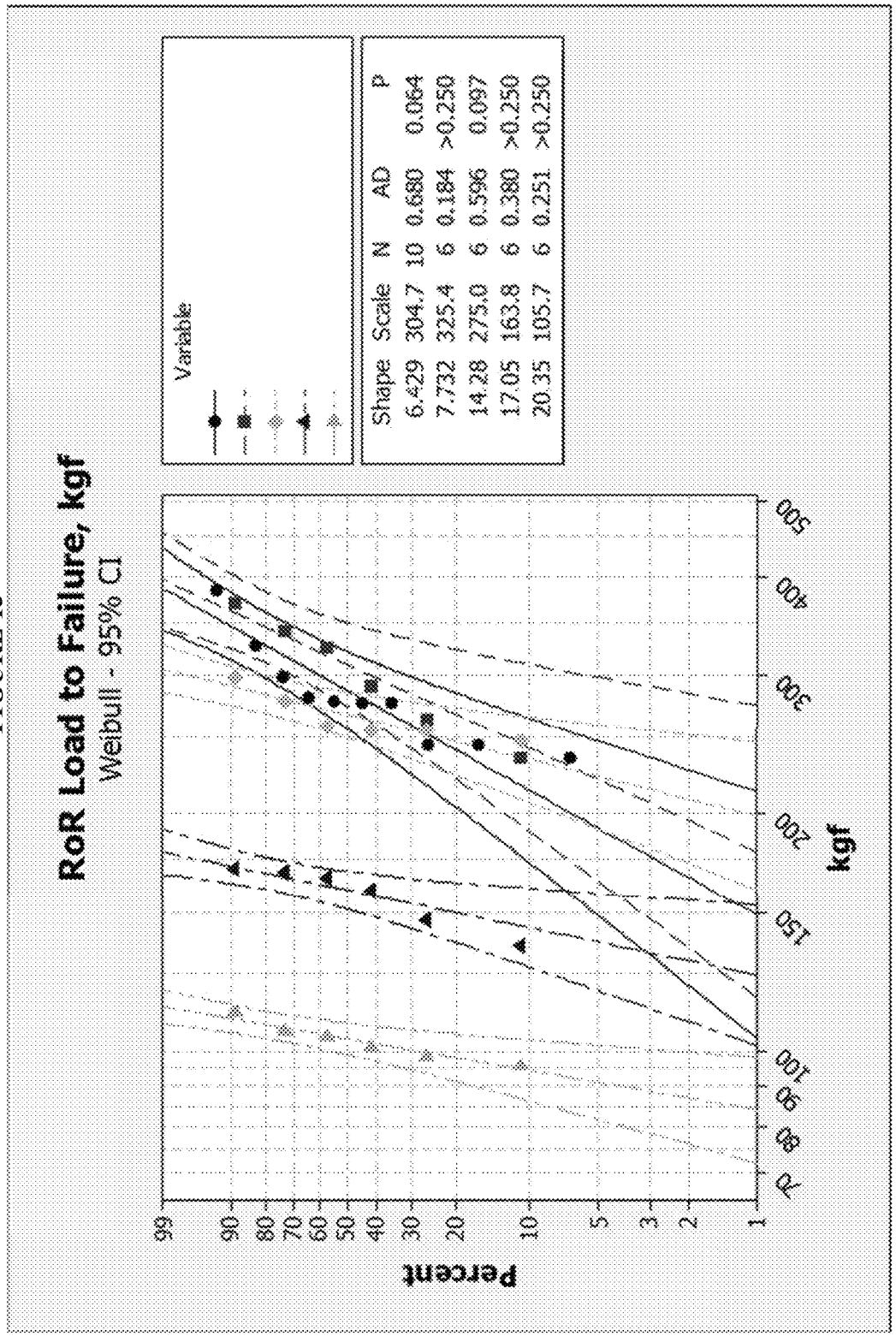
FIG. 13 is a graph presenting ring-on-ring load-to-failure performance of glass substrates or articles according to Examples 5A-5E.
Figure 14:
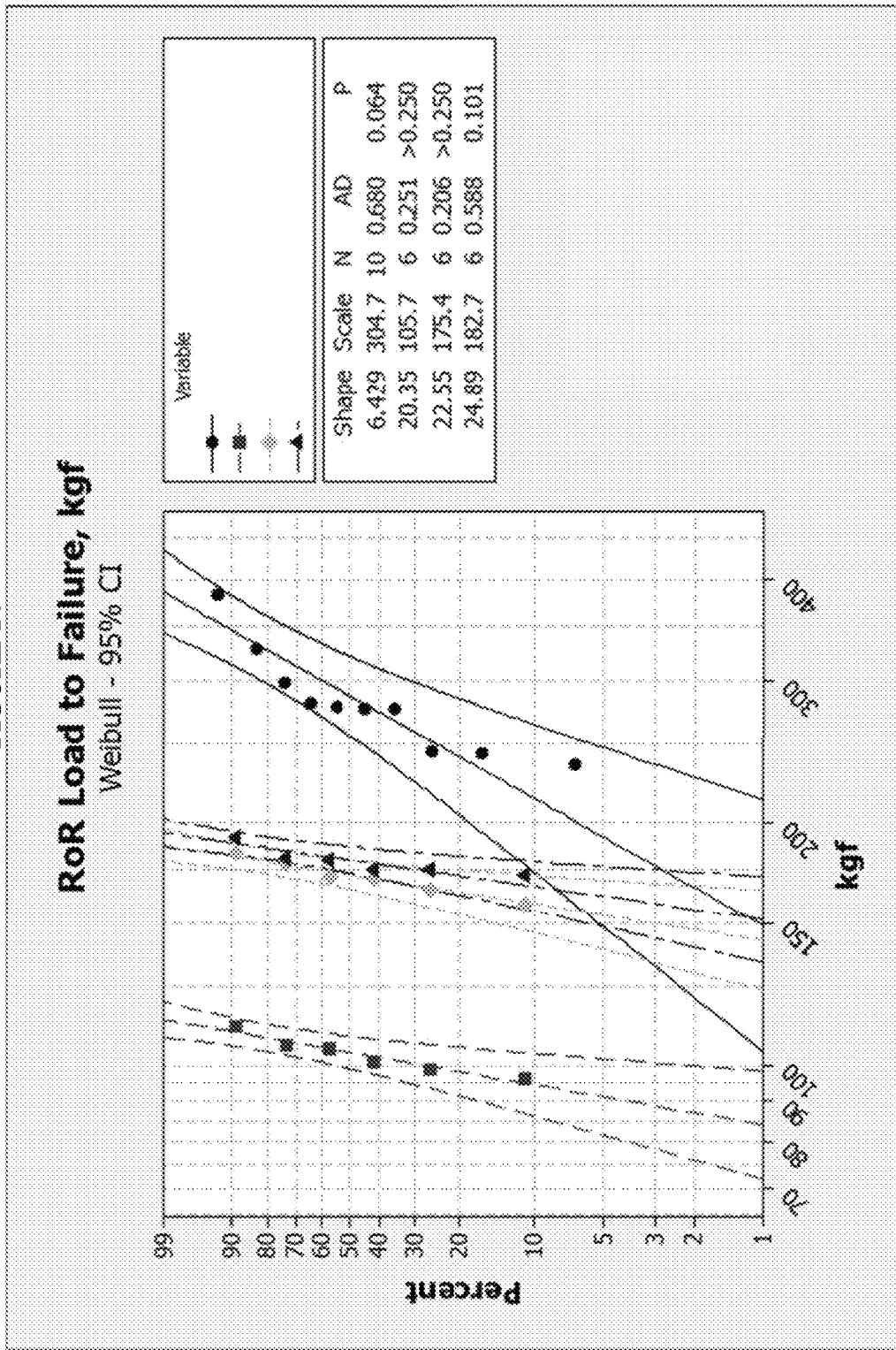
FIG. 14 is a graph presenting ring-on-ring load-to-failure performance of glass substrates or articles according to Examples 5A and 5F-5H.

The average flexural strength of Examples 5A-5G was evaluated in the same manner as Examples 1A-1J. As shown in FIGS. 13 and 14, Examples 5F and 5G (which each included a vapor-deposited nanoporous SiO$_2$ layer disposed between the glass substrate and the ITO film) exhibited improved strength over Examples 5D and 5E (which included only an ITO film). Example 5D and 5E also exhibited a substantial reduction in the average flexural strength over Example 5A (which was a bare glass substrate). Examples 5B and 5C, which included no ITO film exhibited about the same average flexural strength as Example 5A, indicating the nanoporous SiO$_2$ layer did not degrade the strength of the glass substrate.

Examples 5D, which included 100 nm ITO film alone and was annealed, lowered the Weibull characteristic strength of the article to about 106 kgf. The addition of the 200-500 nm nanoporous SiO$_2$ layer between the glass substrate and 100 nm ITO film (with the same annealing cycle), in Examples 5F and 5G, increased the characteristic flexural strength to 175-183 kgf.

In experimental screening, the ITO films deposited on top of the nanoporous SiO$_2$ layers exhibited comparable resistivity levels as the ITO films deposited directly on the glass substrate (with no intervening nanoporous SiO$_2$ layer). Sheet resistance ranged from 35-95 ohms/square for Examples 5D-5G (which corresponds to resistivity less than about $10 \times 10^{-4}$ ohm-cm).

Example 6: Polymeric Crack Mitigating Layer with Aluminum Oxynitride Film

Examples 6A-6F were made by providing 1.0 mm thick ion-exchange strengthened aluminosilicate glass substrates. The glass substrate included a composition of 61 mol %≤SiO$_2$≤75 mol %; 7 mol %≤Al$_2$O$_3$≤15 mol %; 0 mol %≤B$_2$O$_3$≤12 mol %; 9 mol %≤Na$_2$O≤21 mol %; 0 mol %≤K$_2$O≤4 mol %; 0 mol %≤MgO≤7 mol %; 0 mol %≤CaO≤3 mol %, and 0 mol %≤SnO2≤1 mol %. The glass substrates were ion-exchanged in a KNO$_3$ molten salt bath having a temperature of about 350-450° C. for 3-8 hours to provide strengthened glass substrates. The strengthened glass substrates had a compressive stress of about 885 MPa and an ion-exchange depth of layer of about 42 microns. The strengthened glass substrates were then cleaned in a KOH detergent solution (1-4% Semiclean KG), having a temperature of about 50-70° C. with ultrasonic agitation at 40-110 KHz, rinsed in DI water with ultrasonics in the same frequency range, and dried.

The strengthened glass substrate of Comparative Example 6A was left bare, with no layers or films disposed thereon. A AlO$_x$N$_y$ film having a thickness of about 2000 nm was disposed on the strengthened glass substrate of Comparative Example 6B, with no crack mitigating layer disposed between the AlO$_x$N$_y$ film and the glass substrate. A crack mitigating layer including polyimide was disposed on the glass substrates of Examples 6C-6D and a crack mitigating layer including polyetherimide was disposed on the glass substrates of Examples 6E-6F. The crack mitigating layer of Examples 6C-6F had varying thickness as summarized in Table 6. An AlO$_x$N$_y$ film having a thickness of 2000 nm was disposed on the crack mitigating layer of each of Examples 6C-6F. The AlO$_x$N$_y$ films were disposed on the crack mitigating layer of Examples 6C-6F in the same manner as Comparative Example 6B.

In Examples 6C-6F the following procedure was used to form the crack mitigating layers. Prior to disposing the crack mitigating layer, the strengthened glass substrates were baked for 10 minutes on a hot plate at a temperature of about 130° C., and then removed to cool for about 2 minutes. An aminosilane-based adhesion promoter (supplied by HD Microsystems under the name VM-652) was applied to one major surface of the strengthened glass substrates and allowed to remain in the wet state for 20 seconds. The adhesion promoter was spun off the strengthened glass substrates, by spinning the glass substrate with the adhesion promoter applied thereon in a standard vacuum-chuck spin coater at 5000 RPM. After application of the adhesion promoter, Examples 6C and 6D were combined with a solution of polyimide (supplied by HD Microsystems under the name PI-2555). The polyimide solution was in some cases diluted with a thinner comprising N-methyl-2-pyrrolidone (NMP, supplied by HD Microsystems under the name T9038/9), using volume ratios as set out below, and was applied to the strengthened glass substrates of Examples 6C and 6D. About 1 mL of the polymer solution was applied to each glass sample measuring 50×50 mm square. The strengthened glass substrates with the polyimide solution were then spun at 500 RPM for 3 seconds, followed by subsequent rotation of 1000-3000 RPM for 45 seconds to obtain the desired thickness and/or concentration of the crack mitigating layer. Example 6C had a polyimide thickness of 970 nm and was prepared using polyimide solution diluted in a 60:40 ratio with the solvent thinner and was spun first at a rotation of 500 RPM for 3 seconds, followed by a subsequent rotation of 2000 RPM for 45 seconds. Example 6D had a polyimide thickness of 4800 nm and was prepared using polyimide solution that was not diluted with the solvent thinner and was spun first at a rotation of 500 RPM for 3 seconds, followed by a subsequent rotation of 1500 RPM for 45 seconds.

Examples 6E and 6F were prepared similarly, except that a polyetherimide (PEI) (supplied as pellets by Aldrich under product no. 700193) solution was utilized. The PEI was dissolved in the same solvent thinner as used in Examples 6C and 6D to provide a solution with a PEI concentration of between 5-20 wt % and were spin-coated at speeds of 5000 RPM for 30 seconds to obtain the desired thickness and/or concentration of the crack mitigating layer. Example 6E had a PEI thickness of 185 nm and was prepared using a 5 wt % PEI solution, with the remainder comprising the solvent thinner, and was spun at a subsequent rotation of 5000 RPM for 30 seconds. Example 6F had a PEI thickness of 4000 nm and was prepared using a 20 wt % PEI solution, with the remainder comprising the solvent thinner, and was spun at a subsequent rotation of 5000 RPM for 30 seconds.

Examples 6C-6F were then baked on a hot plate at a temperature of 130° C. for 2-3 minutes and then placed in an $N_2$ curing oven (supplied by YES) operating at a pressure of 280 torr and cured at a temperature of 240° C. for 90 minutes.

The $AlO_xN_y$ films were then deposited either onto bare glass (Comp. Example 6B) or onto a crack mitigating layer (Examples 6C-6F) by DC reactive sputtering from an aluminum target, using a vacuum chamber at a pressure of about 0.75 mTorr in the presence of argon flowed at a rate of 115 sccm, nitrogen flowed at a rate of 50 sccm and oxygen flowed at a rate of 2 sccm. DC power was supplied at 4000 W. The $AlO_xN_y$ film was formed at a deposition rate of about 70 angstroms/minute. Table 6 summarizes the attributes of Examples 6A-6F.

TABLE 6

Examples 6A-6F.

| Example | Crack Mitigating Layer Material | Crack Mitigating Layer Thickness | $AlO_xN_y$ Film Thickness | Weibull characteristic strength |
|---|---|---|---|---|
| Example 6A (comparative) | None | N/A | None | 677 kgf |
| Example 6B (comparative) | None | N/A | 2000 nm | 153 kgf |
| Example 6C | Polyimide | 970 nm | 2000 nm | 208 kgf |
| Example 6D | Polyimide | 4800 nm | 2000 nm | 636 kgf |
| Example 6E | Polyetherimide | 185 nm | 2000 nm | 252 kgf |
| Example 6F | Polyetherimide | 4000 nm | 2000 nm | 660 kgf |

Figure 15:
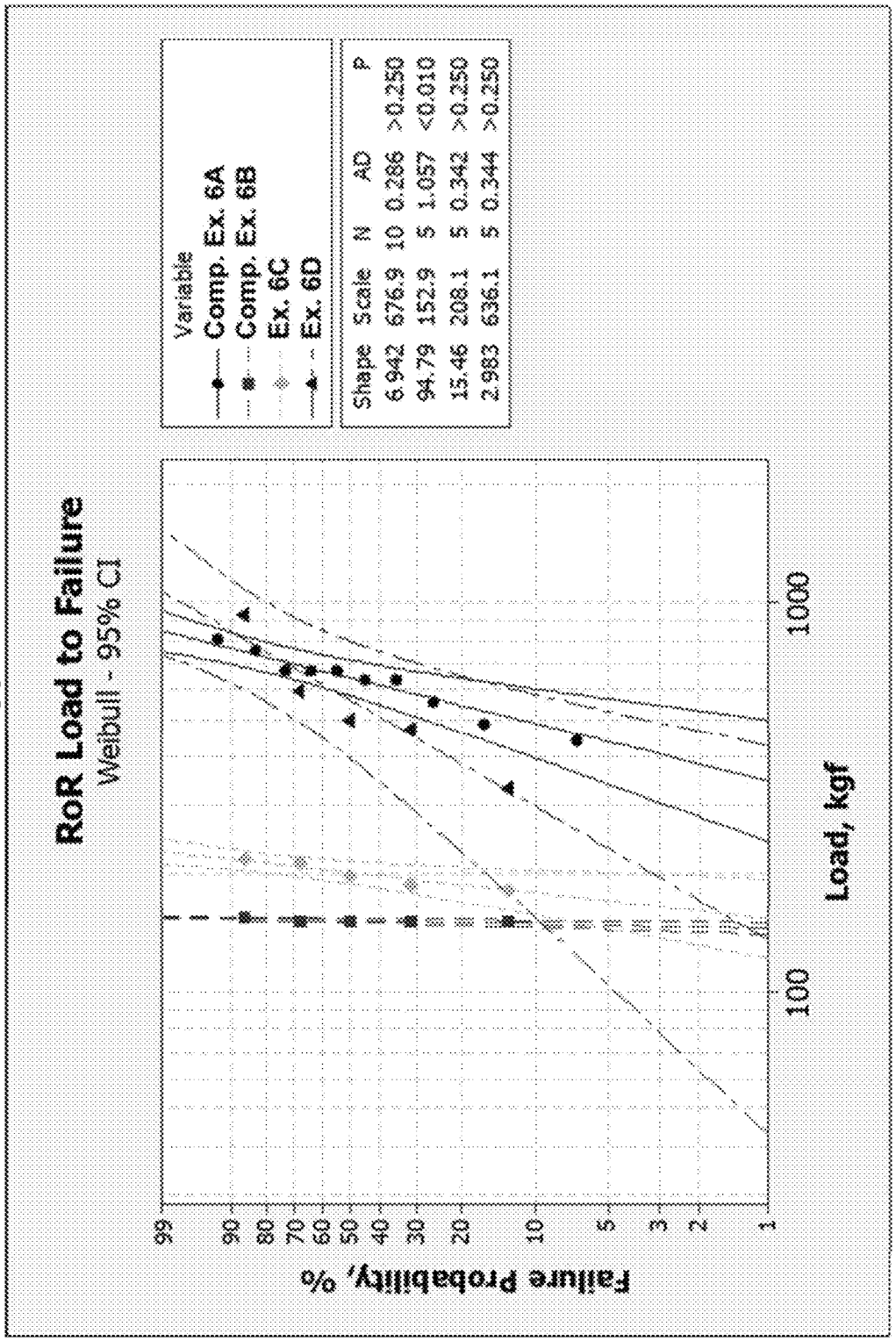
FIG. 15 is a graph presenting ring-on-ring load-to-failure performance of glass substrates or articles according to Examples 6A-6D.
Figure 16:
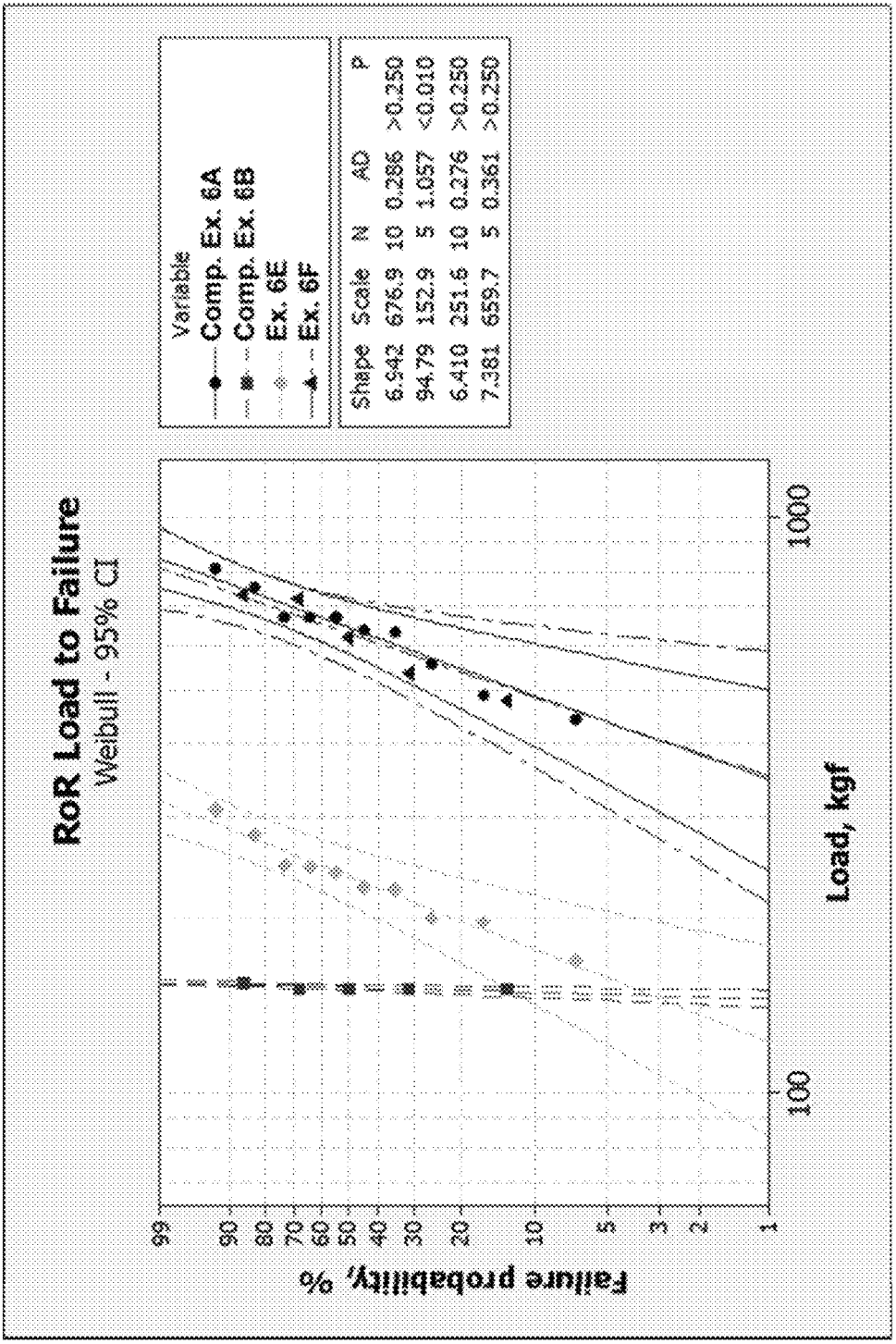
FIG. 16 is a graph presenting ring-on-ring load-to-failure performance of glass substrates or articles according to Examples 6A-6B and Examples 6E-6F.

The average flexural strength of Examples 6A-6F was evaluated in ring-on-ring strength testing in the same manner as Examples 1A-1J. As shown in FIGS. 15 and 16, Examples 6C-6F (which each included polymeric crack mitigating layers) all exhibited improved average flexural strength (reported in terms of ring-on-ring load to failure) when compared to Comparative Example 6B, which included an $AlO_xN_y$ film disposed directly onto a glass substrate with no intervening crack mitigating layer. In addition, Examples 6D and 6F, which included crack mitigating layers having a thickness of 4800 nm and 4000 nm, respectively, exhibited substantially the same or statistically overlapping average flexural strength as the original uncoated glass substrates (Comp. Example 6A). Comparative Example 6B, which included a 2000 nm $AlO_xN_y$ film coated directly onto a glass substrate, lowered the Weibull characteristic strength of the coated glass article to about 153 kgf, compared to a characteristic strength of about 677 kgf for Comparative Example 6A (i.e., the uncoated 'control' glass sample). In comparison, as shown in Table 6, Example 6C had a characteristic strength of about 208 kgf, Example 6D had a characteristic strength of about 636 kgf, Ex.ample. 6E had a characteristic strength of about 252 kgf, and Example 6F had a characteristic strength of about 660 kgf. A comparison of Comparative Example 6B with Examples 6C-6F demonstrates that the crack mitigating layer substantially improved the average flexural strength of the articles of Examples 6C and 6F and the articles of Examples 6C-6F have improved average flexural strength as compared to articles that include the same glass substrate and the same film, but no crack mitigating layer (e.g., Comparative Example 6B).

Example 7: Nanoporous Inorganic Crack Mitigating Layer with Aluminum Oxynitride Film Examples 7A-7B were made by providing 1.0 mm thick ion-exchange strengthened aluminosilicate glass substrates. The glass substrate included a composition of 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤$MgO$≤7 mol %; 0 mol %≤$CaO$≤3 mol %, and 0 mol %≤$SnO2$≤1 mol %. The glass substrates were ion-exchanged in a $KNO_3$ molten salt bath having a temperature of about 350-450° C. for 3-8 hours to provide strengthened glass substrates. The strengthened glass substrates had a compressive stress of about 885 MPa and an ion-exchange depth of layer of about 42 microns. The glass substrates were then cleaned in a KOH detergent solution (1-4% Semiclean KG), having a temperature of about 50-70° C. with ultrasonic agitation at 40-110 KHz, rinsed in DI water with ultrasonics in the same frequency range, and dried.

Five glass substrates of Comparative Example 7A were left bare, with no layers or films disposed thereon. A nanoporous $SiO_2$ layer was deposited on five glass substrates of Example 7B in a vacuum chamber using resistive thermal evaporation of a SiO precursor material at a deposition rate of 5 angstroms/second, a deposition pressure of $9.0 \times 10^{-4}$ Torr, an oxygen flow rate of 150 sccm, an argon flow rate of 100 sccm, and a substrate temperature of initially about 25° C., which increased up to about 50° C. during deposition, due to the heat generated by the deposition process. The five samples of Example 7B were then further coated with 2000 nm thick $AlO_xN_y$ films by DC reactive sputtering from an aluminum target at a pressure of about 0.75 mTorr in the presence of argon flowed at a rate of 115 sccm, nitrogen flowed at a rate of 50 sccm and oxygen flowed at a rate of 4 sccm. DC power was supplied at 4000 W. The $AlO_xN_y$ film was formed at a deposition rate of about 70 angstroms/minute. Table 7 summarizes the attributes and average strength values of Examples 7A-7B. As can be seen in Table 7, the average strength of the uncoated glass samples (Comparative Example 7A) from this set was about 330 kgf, in this case calculated as a mean value of the five tested samples in terms of RoR load to failure. The average strength of the samples of Example 7B was about 391 kgf. Considering the standard deviations of the average strength values, one of ordinary skill in the art can readily understand that the strength distributions of these two samples sets (Comparative Example 7A and Example 7B) are statistically similar, or substantially the same. Weibull distribution analysis yields a similar statistical conclusion. As illustrated by Comparative Example 6B, similar 2000 nm thick $AlO_xN_y$ films disposed directly onto similar glass substrates yielded RoR average load to failure values of about 140-160 kgf. Thus, the crack mitigating layer of Example 7B led to a substantial improvement in the coated glass strength, relative to the same or substantially identical articles made without the crack mitigating layer.

TABLE 7

Examples 7A-7B.

| Example | Nanoporous SiO$_2$ Layer Thickness | AlO$_x$N$_y$ Film Thickness | Average Strength (Mean Load to Failure in RoR, kgf) | Std. Deviation of Load to Failure, kgf |
|---|---|---|---|---|
| Example 7A (comparative) | None | None | 330 | 28.1 |
| Example 7B | 2000 nm | 2000 nm | 391 | 71.5 |

While the disclosure has been described with respect to a limited number of embodiments for the purpose of illustration, those skilled in the art, having benefit of this disclosure, will appreciate that other embodiments can be devised which do not depart from the scope of the disclosure as disclosed herein. Accordingly, various modifications, adaptations and alternatives may occur to one skilled in the art without departing from the spirit and scope of the present disclosure.

We claim:

1. An article, comprising:
a substrate having a thickness from about 250 μm to about 2000 μm and opposing major surfaces including a first major surface and a second major surface;
a crack mitigating layer disposed on and directly in contact with the first major surface of the substrate, wherein the crack mitigating layer has a thickness from about 0.01 μm to about 10 μm; and
a first film disposed on the crack mitigating layer having a thickness from about 0.01 μm to about 20 μm,
wherein an average strain-to-failure of the substrate is 0.5% or greater, as measured with the crack mitigating layer disposed on and directly in contact with the first major surface of the substrate and the first film disposed on the crack mitigating layer.

2. The article according to claim 1, wherein the crack mitigating layer has a modulus that is less than a modulus of the first film and a modulus of the substrate and a thickness from about 0.01 μm to less than 0.1 μm.

3. The article according to claim 1, wherein the crack mitigating layer comprises a porous or non-porous polymeric material.

4. The article according to claim 3, wherein the crack mitigating layer comprises a silicon-containing material.

5. The article according to claim 1, wherein the crack mitigating layer comprises a nano-porous, porous or non-porous inorganic or hybrid organic-inorganic material.

6. The article according to claim 1, wherein the substrate is a glass substrate that is chemically strengthened and has a surface compressive stress of at least 500 MPa and a compressive depth of layer of at least 15 μm.

7. The article according to claim 1, wherein the first film further comprises one or more of an average strain-to-failure that is less than an average strain-to-failure of the substrate and a modulus that is greater than a modulus of the substrate, and wherein the first film is a layered structure.

8. The article according to claim 7, wherein the first film comprises an anti-reflection (AR) film.

9. The article according to claim 1, wherein the article is substantially optically transparent with an optical transmission haze of 10% or less.

10. A display device comprising the article of claim 1, wherein the article serves as a protective cover for the display device.

11. The article of claim 1, wherein the thickness of the crack mitigating layer is from about 35 nm to about 80 nm, and the thickness of the substrate is from about 300 μm to about 1000 μm.

12. An article, comprising:
a glass substrate having a thickness from about 250 μm to about 2000 μm and opposing major surfaces including a first major surface and a second major surface;
a crack mitigating layer disposed on and directly in contact with the first major surface of the glass substrate, wherein the crack mitigating layer comprises (i) a siloxane, a polysiloxane, or an organically modified silica or silicate and (ii) a thickness from about 0.01 μm to about 0.5 μm; and
a first film disposed on the crack mitigating layer having a thickness from about 0.01 μm to about 20 μm,
wherein the crack mitigating layer has an elastic modulus that is less than an elastic modulus of the glass substrate.

13. The article of claim 12, wherein the crack mitigating layer comprises a siloxane.

14. The article of claim 12, wherein the crack mitigating layer comprises a polysiloxane.

15. The article of claim 12, wherein the crack mitigating layer comprises an organically modified silica or silicate.

16. The article of claim 12, wherein the thickness of the crack mitigating layer is from about 0.01 μm to less than 0.1 μm.

17. The article of claim 12, wherein the thickness of the crack mitigating layer is from about 35 nm to about 80 nm, and the thickness of the glass substrate is from about 300 μm to about 1000 μm.

18. An article, comprising:
a substrate having a thickness and opposing major surfaces including a first major surface and a second major surface;
a crack mitigating layer disposed on and directly in contact with the first major surface of the substrate, wherein the crack mitigating layer has a thickness from about 0.01 μm to about 10 μm;
a first film disposed on the crack mitigating layer having a thickness from about 0.01 μm to about 20 μm; and
a further film disposed on and in direct contact with the second major surface of the substrate having a thickness from about 0.01 μm to about 20 μm,
wherein an average strain-to-failure of the substrate is 0.5% or greater, as measured with the crack mitigating layer disposed on and directly in contact with the first major surface of the substrate and the first film disposed on the crack mitigating layer.

19. The article according to claim 18, wherein the further film is a layered structure, and further wherein the further film comprises a scratch-resistant layer.

20. The article according to claim 18, wherein the further film comprises one or more of SiO$_2$, Si$_3$N$_4$, SiO$_x$N$_y$, and combinations thereof.

21. The article according to claim 18, wherein the article further comprises:
one or more additional films disposed on the second major surface of the substrate comprising one or more of SiO$_x$, SiN$_y$, SiO$_x$N$_y$, and combinations thereof.

22. The article according to claim 18, wherein the first film comprises an anti-reflection (AR) film and a fingerprint-resistant layer.

23. The article according to claim 22, wherein the AR film is a layered structure comprising one or more of SiO$_2$, TiO$_2$ and Nb$_2$O$_5$.

24. The article according to claim 18, wherein the crack mitigating layer has a thickness from about 0.01 µm to less than 0.1 µm.

25. The article according to claim 18, wherein the crack mitigating layer has a modulus that is less than a modulus of the first film and a modulus of the substrate.

26. The article according to claim 18, wherein the crack mitigating layer comprises a porous or non-porous polymeric material.

27. The article according to claim 26, wherein the crack mitigating layer comprises a silicon-containing material.

28. The article according to claim 18, wherein the crack mitigating layer comprises a nano-porous, porous or non-porous inorganic or hybrid organic-inorganic material.

29. The article according to claim 18, wherein the substrate is a glass substrate that is chemically strengthened and has a surface compressive stress of at least 500 MPa and a compressive depth of layer of at least 15 µm.

30. The article according to claim 18, wherein the first film further comprises one or more of an average strain-to-failure that is less than an average strain-to-failure of the substrate and a modulus that is greater than a modulus of the substrate.

31. The article according to claim 18, wherein the article is substantially optically transparent with an optical transmission haze of 10% or less.

32. A display device comprising the article of claim 18, wherein the article serves as a protective cover for the display device.

33. The article of claim 18, wherein the thickness of the crack mitigating layer is from about 35 nm to about 80 nm, and the thickness of the substrate is from about 300 µm to about 1000 µm.

34. An article, comprising:
a glass substrate having a thickness and opposing major surfaces including a first major surface and a second major surface;
a crack mitigating layer disposed on and directly in contact with the first major surface of the glass substrate, wherein the crack mitigating layer comprises a silicon-containing polymeric material and has a thickness from about 0.01 µm to about 0.25 µm;
a first film disposed on the crack mitigating layer having a thickness from about 0.01 µm to about 20 µm; and
a further film disposed on and in direct contract with the second major surface of the glass substrate having a thickness from about 0.01 µm to about 20 µm,
wherein an average strain-to-failure of the glass substrate is 0.5% or greater, as measured with the crack mitigating layer disposed on and directly in contact with the first major surface of the glass substrate and the first film disposed on the crack mitigating layer,
wherein the first film comprises an anti-reflection (AR) film, the AR film a layered structure comprising one or more of $SiO_2$, $TiO_2$ and $Nb_2O_5$,
wherein the further film is a layered structure that comprises a scratch-resistant layer and one or more of $SiO_2$, $SiO_x$, $SiN_y$, $Si_3N_4$, $SiO_xN_y$, and combinations thereof, and
further wherein the glass substrate is chemically strengthened and has a surface compressive stress of at least 500 MPa and a compressive depth of layer of at least 15 µm.

35. The article according to claim 34, wherein the crack mitigating layer further comprises a modulus that is less than a modulus of the first film and a modulus of the glass substrate and a thickness from about 0.01 µm to less than 0.1 µm.

36. The article according to claim 34, wherein the crack mitigating layer comprises a fracture toughness of 0.5 $MPa*m^{1/2}$ or greater.

37. The article according to claim 34, wherein the first film further comprises a modulus of at least 25 GPa and a hardness of at least 1.75 GPa.

38. The article according to claim 34, wherein the article exhibits a reflectance of about 10% or less across a visible wavelength range from 400 nm to 700 nm.

39. The article of claim 34, wherein the thickness of the crack mitigating layer is from about 35 nm to about 80 nm, and the thickness of the glass substrate is from about 300 µm to about 1000 µm.

* * * * *

UNITED STATES PATENT AND TRADEMARK OFFICE
CERTIFICATE OF CORRECTION

| | | |
|---|---|---|
| PATENT NO. | : 11,434,166 B2 | Page 1 of 1 |
| APPLICATION NO. | : 17/205699 | |
| DATED | : September 6, 2022 | |
| INVENTOR(S) | : Heather Bossard Decker et al. | |

It is certified that error appears in the above-identified patent and that said Letters Patent is hereby corrected as shown below:

On the Title Page

On the page 2, in Column 2, Item (56) under "Other Publications", Line 10, delete ""flexrural" and insert -- "flexural --.

On the page 2, in Column 2, Item (56) under "Other Publications", Line 10, delete "factography" and insert -- fractography --.

On the page 3, in Column 2, Item (56) under "Other Publications, Line 10, delete "MEchanical" and insert -- Mechanical --.

In the Claims

In Column 48, Line 12, in Claim 34, delete "a" and insert -- is a --.

Signed and Sealed this
Fifteenth Day of August, 2023

Katherine Kelly Vidal
*Director of the United States Patent and Trademark Office*